US008337286B2

(12) United States Patent
Imura et al.

(10) Patent No.: US 8,337,286 B2
(45) Date of Patent: Dec. 25, 2012

(54) GAMING MACHINE WITH IMAGE DISPLAY ASSISTANCE FEATURE

(75) Inventors: Hideaki Imura, Tokyo (JP); Shingo Omomo, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 2213 days.

(21) Appl. No.: 10/697,041

(22) Filed: Oct. 31, 2003

(65) Prior Publication Data

US 2004/0147303 A1 Jul. 29, 2004

(30) Foreign Application Priority Data

Nov. 18, 2002 (JP) ................................ 2002-334118

(51) Int. Cl.
*A63F 13/00* (2006.01)

(52) U.S. Cl. ................. 463/16; 463/46; 463/31; 463/34

(58) Field of Classification Search .................... 463/16, 463/31, 34

See application file for complete search history.

(56) References Cited

U.S. PATENT DOCUMENTS

| | | | | |
|---|---|---|---|---|
| 4,306,768 | A | 12/1981 | Egging | 350/174 |
| 4,371,870 | A | 2/1983 | Biferno | 340/716 |
| 4,454,670 | A | 6/1984 | Bachmann et al. | 194/350 |
| 4,517,558 | A | 5/1985 | Davids | 340/700 |
| 4,518,225 | A | 5/1985 | Fredrickson et al. | 350/338 |
| 4,562,433 | A | 12/1985 | Biferno | 340/716 |
| 4,568,928 | A | 2/1986 | Biferno | 340/716 |
| 4,718,672 | A | 1/1988 | Okada | 273/143 |
| 4,756,414 | A | 7/1988 | Mott | 206/328 |
| 4,826,296 | A | 5/1989 | Yoshimura | 350/338 |
| 4,976,429 | A | 12/1990 | Nagel | 273/1 |
| 4,998,804 | A | 3/1991 | Horiuchi | 350/334 |
| 5,146,354 | A | 9/1992 | Plesinger | 359/49 |
| 5,152,529 | A | 10/1992 | Okada | 273/143 |
| 5,258,844 | A | 11/1993 | Nakayama et al. | 358/209 |
| 5,283,560 | A | 2/1994 | Bartlett | 345/113 |
| 5,351,966 | A | 10/1994 | Tohyama et al. | 273/311 |
| 5,372,745 | A | 12/1994 | Yoshinaga | 252/299 |
| 5,375,043 | A | 12/1994 | Tokunaga | 362/31 |

(Continued)

FOREIGN PATENT DOCUMENTS

AU 1999-043488 3/2000

(Continued)

OTHER PUBLICATIONS

European Search Report Dated Aug. 9, 2004.

(Continued)

*Primary Examiner* — Dmitry Suhol
*Assistant Examiner* — Andrew Kim
(74) *Attorney, Agent, or Firm* — Nixon Peabody LLP

(57) ABSTRACT

With liquid crystal provided in front of reels, a gaming machine includes reels 3 having symbol placement faces shaped like curved surfaces on which a plurality of symbols are placed for variably displaying of a plurality of symbol rows each made up of the plurality of symbols, liquid crystal 504 being provided in front of and opposed to the reels 3 for displaying the symbols through a flat symbol transmission face and also displaying an image concerning game play, reel backlights 513 for illuminating the symbols, and reel side reflectors 320 being provided on a side of the reels 3 for covering an area sandwiched between the symbol placement face and the symbol transmission face on a face on the side of the reels 3 for assisting image display of the liquid crystal 504.

22 Claims, 15 Drawing Sheets

U.S. PATENT DOCUMENTS

| | | | | |
|---|---|---|---|---|
| 5,393,061 | A | 2/1995 | Manship et al. | 273/143 R |
| 5,546,296 | A | 8/1996 | Savignac et al. | 363/60 |
| 5,580,055 | A * | 12/1996 | Hagiwara | 273/143 R |
| 5,636,101 | A | 6/1997 | Bonsall et al. | 361/681 |
| 5,667,439 | A | 9/1997 | Okada | 463/20 |
| 5,673,128 | A | 9/1997 | Ohta et al. | 349/62 |
| 5,691,788 | A | 11/1997 | Kim | 349/96 |
| 5,695,188 | A | 12/1997 | Ishibashi | 273/143 R |
| 5,697,843 | A | 12/1997 | Manship et al. | 463/20 |
| 5,722,891 | A | 3/1998 | Inoue | 463/20 |
| 5,725,210 | A | 3/1998 | Yamaguchi et al. | 273/121 |
| 5,725,428 | A | 3/1998 | Achmuller | 463/20 |
| 5,745,199 | A | 4/1998 | Suzuki et al. | 349/95 |
| 5,752,881 | A | 5/1998 | Inoue | 463/20 |
| 5,768,095 | A | 6/1998 | Nakamura et al. | 361/681 |
| 5,810,665 | A | 9/1998 | Takemoto et al. | 463/31 |
| 5,836,819 | A | 11/1998 | Ugawa | 463/30 |
| 5,890,962 | A | 4/1999 | Takemoto | 463/20 |
| 5,920,256 | A | 7/1999 | Toffolo | 340/461 |
| 5,934,672 | A | 8/1999 | Sines et al. | 273/143 R |
| 5,980,384 | A | 11/1999 | Barrie | 463/16 |
| 6,027,115 | A | 2/2000 | Griswold et al. | 273/143 R |
| 6,036,188 | A | 3/2000 | Gomez et al. | 273/118 R |
| 6,038,188 | A | 3/2000 | Akamatsu | 365/226 |
| 6,056,642 | A | 5/2000 | Bennett | 463/20 |
| 6,086,066 | A | 7/2000 | Takeuchi et al. | 273/143 R |
| 6,089,977 | A | 7/2000 | Bennett | 463/20 |
| 6,095,921 | A | 8/2000 | Walker et al. | 463/20 |
| 6,135,884 | A | 10/2000 | Hedrick et al. | 463/20 |
| 6,135,885 | A | 10/2000 | Lermusiaux | 463/20 |
| 6,141,067 | A | 10/2000 | Ikka | 349/65 |
| 6,151,169 | A | 11/2000 | Kim | 359/640 |
| 6,159,097 | A | 12/2000 | Gura | 463/20 |
| 6,164,645 | A | 12/2000 | Weiss | 273/138.2 |
| 6,181,301 | B1 | 1/2001 | Inoguchi et al. | 345/5 |
| 6,190,255 | B1 | 2/2001 | Thomas et al. | 463/20 |
| 6,193,606 | B1 | 2/2001 | Walker et al. | 463/20 |
| 6,219,228 | B1 | 4/2001 | Sun | 361/683 |
| 6,224,482 | B1 | 5/2001 | Bennett | 463/20 |
| 6,251,013 | B1 | 6/2001 | Bennett | 463/13 |
| 6,261,177 | B1 | 7/2001 | Bennett | 463/16 |
| 6,270,411 | B1 | 8/2001 | Gura et al. | 463/20 |
| 6,290,600 | B1 | 9/2001 | Glasson | 463/20 |
| 6,315,663 | B1 | 11/2001 | Sakamoto | 463/20 |
| 6,317,128 | B1 | 11/2001 | Harrison et al. | 345/629 |
| 6,339,418 | B1 | 1/2002 | Kitagawa | 345/102 |
| 6,364,766 | B1 | 4/2002 | Anderson et al. | 463/16 |
| 6,368,216 | B1 | 4/2002 | Hedrick et al. | 463/20 |
| 6,375,568 | B1 | 4/2002 | Roffman et al. | 463/26 |
| 6,377,339 | B1 | 4/2002 | Westerman | 355/75 |
| 6,406,159 | B1 | 6/2002 | Yamamoto | 362/31 |
| 6,419,579 | B1 | 7/2002 | Bennett | 463/20 |
| 6,475,087 | B1 | 11/2002 | Cole | 463/20 |
| 6,517,432 | B1 | 2/2003 | Jaffe | 463/16 |
| 6,517,433 | B2 | 2/2003 | Loose | 463/20 |
| 6,600,527 | B1 | 7/2003 | Basturk et al. | 349/74 |
| 6,623,006 | B2 | 9/2003 | Weiss | 273/138 |
| 6,638,165 | B2 | 10/2003 | Uchiyama et al. | 463/20 |
| 6,642,975 | B2 | 11/2003 | Chino et al. | 349/65 |
| 6,695,696 | B1 | 2/2004 | Kaminkow | 463/16 |
| 6,705,611 | B2 | 3/2004 | Kato | 273/143 R |
| 6,720,021 | B2 | 4/2004 | Wong et al. | 426/633 |
| 6,720,961 | B2 | 4/2004 | Tracy | 345/419 |
| 6,734,927 | B2 | 5/2004 | Sato | 349/58 |
| 6,790,140 | B1 | 9/2004 | Niwa | 463/20 |
| 6,802,575 | B1 | 10/2004 | Lee | 312/72 |
| 6,811,273 | B2 | 11/2004 | Satoh et al. | 362/27 |
| 6,817,946 | B2 | 11/2004 | Motegi et al. | 463/31 |
| 6,820,875 | B1 | 11/2004 | Hedrick et al. | 273/138.1 |
| 6,824,466 | B1 | 11/2004 | Hirota | 463/20 |
| 6,837,790 | B1 | 1/2005 | Kaminkow | 463/31 |
| 6,853,410 | B2 | 2/2005 | Matsuda et al. | 349/67 |
| 6,893,345 | B2 | 5/2005 | Motegi et al. | 463/31 |
| 6,923,721 | B2 | 8/2005 | Luciano et al. | 463/24 |
| 6,937,298 | B2 | 8/2005 | Okada | 349/58 |
| 6,942,571 | B1 | 9/2005 | McAllister et al. | 463/20 |
| 6,954,238 | B2 | 10/2005 | Liu et al. | 349/65 |
| 6,976,915 | B2 | 12/2005 | Baker et al. | 463/1 |
| 7,092,048 | B2 | 8/2006 | Jeong | 349/58 |
| 7,097,560 | B2 | 8/2006 | Okada | 463/20 |
| 7,115,033 | B1 | 10/2006 | Timperley | 463/20 |
| 7,140,963 | B2 | 11/2006 | Kojima | 463/20 |
| 7,159,865 | B2 | 1/2007 | Okada | 273/143 |
| 7,160,187 | B2 | 1/2007 | Loose et al. | 463/20 |
| 7,166,029 | B2 | 1/2007 | Enzminger | 463/20 |
| 7,169,048 | B2 | 1/2007 | Nozaki et al. | 463/30 |
| 7,204,753 | B2 | 4/2007 | Ozaki et al. | 463/16 |
| 7,207,883 | B2 | 4/2007 | Nozaki et al. | 463/24 |
| 7,219,893 | B2 | 5/2007 | Tanimura et al. | 273/143 |
| 7,220,181 | B2 | 5/2007 | Okada | 463/32 |
| 7,234,697 | B2 | 6/2007 | Okada | 273/143 |
| 7,255,643 | B2 | 8/2007 | Ozaki et al. | 463/20 |
| 7,281,980 | B2 | 10/2007 | Okada et al. | 463/20 |
| 7,322,884 | B2 | 1/2008 | Emori et al. | 463/16 |
| 7,329,181 | B2 | 2/2008 | Hoshino et al. | 463/20 |
| 7,355,660 | B2 | 4/2008 | Ikeda | 349/60 |
| 7,390,259 | B2 | 6/2008 | Okada | 463/20 |
| 7,404,766 | B2 | 7/2008 | Adachi et al. | 463/31 |
| 7,458,890 | B2 | 12/2008 | Loose et al. | 463/16 |
| 7,465,228 | B2 | 12/2008 | Okada | 463/20 |
| 7,479,061 | B2 | 1/2009 | Okada | 463/20 |
| 7,479,066 | B2 | 1/2009 | Emori | 463/46 |
| 7,485,039 | B2 | 2/2009 | Okada | 463/20 |
| 7,510,475 | B2 | 3/2009 | Loose et al. | 463/31 |
| 7,510,476 | B2 | 3/2009 | Kobayashi | 463/31 |
| 7,520,812 | B2 | 4/2009 | Okada | 463/31 |
| 7,585,220 | B2 | 9/2009 | Loose et al. | 463/20 |
| 7,695,364 | B2 | 4/2010 | Okada | 463/20 |
| 7,730,413 | B1 | 6/2010 | Engel et al. | 715/764 |
| 2001/0000636 | A1 | 5/2001 | Weiss | 273/138.2 |
| 2001/0013681 | A1 | 8/2001 | Bruzzese et al. | 273/143 |
| 2001/0019479 | A1 | 9/2001 | Nakabayashi et al. | 362/31 |
| 2001/0031658 | A1 * | 10/2001 | Ozaki et al. | 463/16 |
| 2001/0050736 | A1 | 12/2001 | Lee et al. | 349/65 |
| 2001/0052955 | A1 | 12/2001 | Nagatani | 349/65 |
| 2002/0063816 | A1 | 5/2002 | Nakamura et al. | 349/65 |
| 2002/0142830 | A1 | 10/2002 | Adams | 463/20 |
| 2002/0175466 | A1 | 11/2002 | Loose et al. | 273/143 |
| 2003/0016313 | A1 | 1/2003 | Jeong | 349/58 |
| 2003/0060269 | A1 | 3/2003 | Paulsen et al. | 463/20 |
| 2003/0087689 | A1 | 5/2003 | Adams | 463/20 |
| 2003/0087690 | A1 | 5/2003 | Loose et al. | |
| 2003/0130028 | A1 | 7/2003 | Aida et al. | 463/20 |
| 2003/0157980 | A1 | 8/2003 | Loose et al. | 463/20 |
| 2003/0162579 | A1 | 8/2003 | Gauselmann | 463/16 |
| 2003/0166417 | A1 | 9/2003 | Moriyama et al. | 463/46 |
| 2003/0184690 | A1 | 10/2003 | Ogiwara et al. | 349/61 |
| 2003/0214471 | A1 | 11/2003 | Topelberg | 345/87 |
| 2003/0234489 | A1 | 12/2003 | Okada | 273/236 |
| 2003/0236118 | A1 | 12/2003 | Okada | 463/20 |
| 2004/0014520 | A1 | 1/2004 | Okada | 463/20 |
| 2004/0021705 | A1 | 2/2004 | Baker et al. | 347/2 |
| 2004/0029636 | A1 | 2/2004 | Wells | 463/32 |
| 2004/0048646 | A1 | 3/2004 | Visocnik | 463/16 |
| 2004/0052078 | A1 | 3/2004 | Hosaka | 362/302 |
| 2004/0062025 | A1 | 4/2004 | Satoh et al. | 362/27 |
| 2004/0063490 | A1 | 4/2004 | Okada | 463/20 |
| 2004/0116178 | A1 | 6/2004 | Okada | 463/20 |
| 2004/0147303 | A1 | 7/2004 | Imura et al. | 463/16 |
| 2004/0150162 | A1 | 8/2004 | Okada | 273/292 |
| 2004/0152501 | A1 | 8/2004 | Okada | 463/16 |
| 2004/0152502 | A1 | 8/2004 | Okada | 463/16 |
| 2004/0166925 | A1 | 8/2004 | Emori et al. | 463/20 |
| 2004/0166926 | A1 | 8/2004 | Adachi et al. | 463/20 |
| 2004/0171418 | A1 | 9/2004 | Okada | 463/20 |
| 2004/0192441 | A1 | 9/2004 | Nonaka | 463/31 |
| 2004/0198485 | A1 | 10/2004 | Loose et al. | 463/20 |
| 2004/0207154 | A1 | 10/2004 | Okada | 273/138.1 |
| 2004/0209666 | A1 | 10/2004 | Tashiro et al. | 463/20 |
| 2004/0209667 | A1 | 10/2004 | Emori et al. | 463/20 |
| 2004/0209668 | A1 | 10/2004 | Okada | 463/20 |
| 2004/0209670 | A1 | 10/2004 | Adachi et al. | 463/20 |
| 2004/0209671 | A1 | 10/2004 | Okada | 463/20 |
| 2004/0209672 | A1 | 10/2004 | Okada | 463/20 |
| 2004/0209676 | A1 | 10/2004 | Onishi et al. | 463/29 |
| 2004/0209678 | A1 | 10/2004 | Okada | 463/30 |
| 2004/0209679 | A1 | 10/2004 | Nonaka | 463/30 |

| | | | | |
|---|---|---|---|---|
| 2004/0209681 | A1 | 10/2004 | Emori et al. | 463/31 |
| 2004/0209682 | A1 | 10/2004 | Okada | 463/31 |
| 2004/0209683 | A1 | 10/2004 | Okada | 463/31 |
| 2004/0214635 | A1 | 10/2004 | Okada | 463/30 |
| 2004/0214636 | A1 | 10/2004 | Nonaka | 463/30 |
| 2004/0214637 | A1 | 10/2004 | Nonaka | 463/31 |
| 2004/0219965 | A1 | 11/2004 | Okada | 463/16 |
| 2004/0224747 | A1 | 11/2004 | Okada | 463/16 |
| 2004/0224758 | A1 | 11/2004 | Okada et al. | 463/31 |
| 2004/0227286 | A1 | 11/2004 | Tanimura et al. | 273/143 |
| 2004/0227866 | A1 | 11/2004 | Okada | 349/58 |
| 2004/0229680 | A1 | 11/2004 | Hoshino et al. | 463/20 |
| 2004/0229686 | A1 | 11/2004 | Tanimura et al. | 463/30 |
| 2004/0242323 | A1 | 12/2004 | Okada | 463/31 |
| 2004/0266510 | A1 | 12/2004 | Kojima | 463/16 |
| 2004/0266515 | A1 | 12/2004 | Gauselmann | 463/20 |
| 2004/0266521 | A1 | 12/2004 | Kojima | 463/20 |
| 2005/0020349 | A1 | 1/2005 | Tachikawa | 463/20 |
| 2005/0032571 | A1 | 2/2005 | Asonuma | 463/20 |
| 2005/0049030 | A1 | 3/2005 | Tachikawa | 463/20 |
| 2005/0049032 | A1 | 3/2005 | Kobayashi | 463/20 |
| 2005/0054433 | A1 | 3/2005 | Iwamoto | 463/25 |
| 2005/0140088 | A1 | 6/2005 | Randall | 273/143 |
| 2005/0153775 | A1 | 7/2005 | Griswold et al. | 463/30 |
| 2005/0170879 | A1 | 8/2005 | Tachikawa | 463/16 |
| 2005/0187003 | A1 | 8/2005 | Adachi et al. | 463/16 |
| 2005/0187006 | A1 | 8/2005 | Tachikawa | 463/20 |
| 2005/0187007 | A1 | 8/2005 | Kuroiwa | 463/20 |
| 2005/0187009 | A1 | 8/2005 | Osawa | 463/20 |
| 2005/0192083 | A1 | 9/2005 | Iwamoto | 463/20 |
| 2005/0192084 | A1 | 9/2005 | Iwamoto | 463/20 |
| 2005/0192085 | A1 | 9/2005 | Iwamoto | 463/20 |
| 2005/0192090 | A1 | 9/2005 | Muir et al. | 463/30 |
| 2005/0255908 | A1 | 11/2005 | Wells | 463/20 |
| 2005/0272500 | A1 | 12/2005 | Tanimura et al. | 463/20 |
| 2005/0282616 | A1 | 12/2005 | Tanimura et al. | 463/20 |
| 2005/0282617 | A1 | 12/2005 | Sekiguchi et al. | 463/20 |
| 2006/0014580 | A1 | 1/2006 | Hawthorn | 463/20 |
| 2006/0089192 | A1 | 4/2006 | Okada | 463/20 |
| 2006/0128467 | A1 | 6/2006 | Thomas | 463/31 |
| 2006/0135248 | A1 | 6/2006 | Anderson et al. | 463/22 |
| 2006/0252496 | A1 | 11/2006 | Rasmussen | 463/20 |
| 2006/0281530 | A1 | 12/2006 | Seelig et al. | 463/20 |
| 2007/0004513 | A1 | 1/2007 | Wells et al. | 463/31 |
| 2007/0054730 | A1 | 3/2007 | Mattice et al. | 463/16 |
| 2007/0060296 | A1 | 3/2007 | Yoshizawa | 463/20 |
| 2007/0123348 | A1 | 5/2007 | Nozaki | 463/30 |
| 2007/0149281 | A1 | 6/2007 | Gadda et al. | 463/34 |
| 2007/0184893 | A1 | 8/2007 | Fujimoto | 463/20 |
| 2008/0020820 | A1 | 1/2008 | Iwamoto | 463/20 |
| 2008/0125210 | A1 | 5/2008 | Iwamoto | 463/20 |
| 2008/0176653 | A1 | 7/2008 | Kishi | 463/31 |
| 2008/0261674 | A9 | 10/2008 | Okada | 463/16 |
| 2008/0311977 | A1 | 12/2008 | Okada | 463/20 |
| 2009/0131148 | A1 | 5/2009 | Loose et al. | 463/20 |
| 2009/0181758 | A1 | 7/2009 | Loose et al. | 463/20 |
| 2009/0247276 | A1 | 10/2009 | Okada | 463/20 |

FOREIGN PATENT DOCUMENTS

| | | | | |
|---|---|---|---|---|
| AU | 2000-030185 | | | 11/2000 |
| CA | 2282782 | | | 3/2000 |
| EP | 0060019 | | | 9/1982 |
| EP | 0 410 789 | A2 | | 1/1991 |
| EP | 0789338 | | | 8/1997 |
| EP | 1260928 | | | 11/2002 |
| EP | 1376494 | | | 1/2004 |
| EP | 1376495 | | | 1/2004 |
| EP | 1424663 | | | 6/2004 |
| GB | 2124505 | A | | 2/1984 |
| GB | 2 165 074 | A | | 4/1986 |
| GB | 2242052 | A | | 9/1991 |
| GB | 2253299 | A | | 9/1992 |
| GB | 2349494 | A | | 11/2000 |
| GB | 2 365 191 | A | | 2/2002 |
| JP | 60-061079 | | | 4/1985 |
| JP | 61-279272 | | | 12/1986 |
| JP | 2019182 | | | 1/1990 |
| JP | 04-109977 | | | 4/1992 |
| JP | 04-114676 | | | 4/1992 |
| JP | 1992-220275 | | | 8/1992 |
| JP | 04-341288 | | | 11/1992 |
| JP | 05-084349 | A | | 4/1993 |
| JP | 05-177043 | | | 7/1993 |
| JP | 06-039085 | | | 2/1994 |
| JP | 1994-142279 | | | 5/1994 |
| JP | 2645791 | B2 | | 10/1994 |
| JP | 07-016340 | | | 1/1995 |
| JP | 07-124290 | | | 5/1995 |
| JP | 07-299189 | | | 11/1995 |
| JP | 08-010381 | | | 1/1996 |
| JP | 08-080364 | | | 3/1996 |
| JP | 08-103541 | | | 4/1996 |
| JP | 2531253 | | | 1/1997 |
| JP | 09-207625 | | | 8/1997 |
| JP | 10-071228 | | | 3/1998 |
| JP | 10-091076 | | | 4/1998 |
| JP | 10-305130 | | | 11/1998 |
| JP | 10-328398 | | | 12/1998 |
| JP | 11-090017 | | | 4/1999 |
| JP | 11-099240 | | | 4/1999 |
| JP | 11-137774 | | | 5/1999 |
| JP | 11-153970 | | | 6/1999 |
| JP | 11-155998 | A | | 6/1999 |
| JP | 11155998 | A | * | 6/1999 |
| JP | 11-206960 | | | 8/1999 |
| JP | 11-244451 | | | 9/1999 |
| JP | 11-253610 | | | 9/1999 |
| JP | 2000-011725 | | | 1/2000 |
| JP | 2000-189554 | | | 7/2000 |
| JP | 2000-262738 | | | 9/2000 |
| JP | 2000-300729 | | | 10/2000 |
| JP | 2000-300731 | | | 10/2000 |
| JP | 2000-350805 | | | 12/2000 |
| JP | 2001-025546 | | | 1/2001 |
| JP | 2001-058046 | | | 3/2001 |
| JP | 2001-062032 | | | 3/2001 |
| JP | 2001-137461 | | | 5/2001 |
| JP | 2001161950 | A | * | 6/2001 |
| JP | 2001-238995 | | | 9/2001 |
| JP | 2001-252393 | A | | 9/2001 |
| JP | 2001-252394 | | | 9/2001 |
| JP | 2001-353255 | | | 12/2001 |
| JP | 2001-353255 | A1 | | 12/2001 |
| JP | 2002-113150 | | | 4/2002 |
| JP | 2002-126161 | A | | 5/2002 |
| JP | 2002143375 | A | * | 5/2002 |
| JP | 2003-236037 | | | 8/2003 |
| JP | 2003-260184 | | | 9/2003 |
| JP | 2004-008705 | | | 1/2004 |
| RU | 2000128696 | | | 10/2002 |
| RU | 2001103774 | | | 1/2003 |
| WO | WO 98/03962 | | | 1/1998 |
| WO | WO 99/53454 | | | 10/1999 |
| WO | WO 99/64997 | | | 12/1999 |
| WO | WO 00/32286 | | | 6/2000 |
| WO | WO 01/28647 | | | 4/2001 |
| WO | WO 01/72387 | | | 10/2001 |
| WO | WO 03/039699 | | | 5/2003 |
| WO | WO 2006/036948 | | | 4/2006 |
| WO | WO 2006/124976 | | | 11/2006 |
| WO | WO 2007/011717 | | | 1/2007 |

OTHER PUBLICATIONS

JPO Office Action—English language translation of Notification of Reason for Refusal, App. No. 2002-334118, Dispatch Date Jun. 12, 2007 (6 pages total).

JPO Office Action—Decision for Refusal (2 pages), App. No. 2002-334118, Oct. 10, 2007 with English translation (5 pages).

"Bigfoot" Product Sheet, Shuffle Master, Inc., 1 page (2000).

"Big Games Safari" Product Sheet, IGT, 24 pages (2000).

"Cabby Cash™" Product Sheet, Anchor Gaming, 2 pages (2000).

"Congo Quest™" Product Sheet, Anchor Gaming, 2 pages (2000).

"Fishin' Buddies™" Product Sheet, Anchor Gaming, 2 pages (2000).

Legato, Frank, "The Full Monty," Strictly Slots, pp. 48-50 (Jun. 1999).

"Goooaal!" Product Sheet, Bally Gaming, Inc., 2 pages (2000).

"Great Whites" Product Sheet, VLC, Inc., 2 pages (2000).
"Jackpot Stampede Deluxe™" Product Sheet, WMS Gaming Inc., 2 pages (1997).
"Loaded Dice" Product Sheet, Konami Gaming, 2 pages (2000).
"Neptune's Pearls" Product Sheet, Unidesa Gaming, 4 pages (1998).
"Penguin Pays" Product Sheet, Aristocrat Incorporated, 2 pages (1998).
"Stroke of Luck™" Product Sheet, WMS Gaming Inc., 2 pages (1997).
"Wild Cougar" Article, Strictly Slots, p. 44 (Feb. 1999).
"Yahtzee® Brand Video Game" Product Brochure, Hasbro, Inc., 2 pages (2000).

* cited by examiner

GAMING MACHINE WITH IMAGE DISPLAY ASSISTANCE FEATURE

BACKGROUND OF THE INVENTION

1. Field of the Invention

The present invention relates to a gaming machine including a liquid crystal display.

2. Description of the Related Art

A recent slot machine including stop buttons or a so-called pinball slot machine (a so-called "Pachi-Slot machine" in Japan) has a variable display means provided with a plurality of rotatable reels for variably displaying symbols in a front display window. As the player performs start operation, control means controls the variable display means for rotating the reels, thereby producing variable display of symbols. Then, the rotating reels are stopped in order automatically in a given time or as the player performs stop operation. At this time, if the symbols on the reels appearing in the display window become a specific combination (winning symbol combination), game medium such as medals and coins are paid out to the player as the prize of the win.

The currently predominant pinball slot machine has a display window for the player to visually check symbols on reels on the front of the machine and a liquid crystal display for displaying an effect image concerning game play on a side of, below, or above the display window (namely, a position not overlapping the display window from the viewpoint of the player). Such a liquid crystal display generally is provided with a backlight for the liquid crystal display implemented as a cold-cathode tube for producing sharp display.

FIG. 13 is a perspective view of the front to show a part of a pinball slot machine in a related art. In FIG. 13, display windows 9004 (9004L, 9004C, and 9004R) are provided in front of a plurality of reels 9003 (9003L, 9003C, and 9003R) on which a plurality of symbols are arranged, so that the player visually checks the symbols placed on the reels 9003 through the display windows 9004. BET lamps 9009 for indicating which of pay lines in the horizontal direction (top line, center line, and bottom line) and pay lines in slanting directions (cross down line and cross up line) is activated are provided on one side of the display window 9004. A medal insertion slot 9022 for the player to insert a medal, BET switches 9011, 9012, and 9013 operated by the player to make the pay line activated, and a display 9005 for displaying an image concerning game play are provided below the display windows 9004.

FIG. 14 is a perspective view of a backside of the door to show a part of the gaming machine in the related art. In FIG. 14, a control circuit board 9530 is attached through a board support member 9520 to one side of and below the display windows 9004 (9004L, 9004C, and 9004R). The control circuit board 9530 is provided for performing display control of the BET lamps 9009 and the display 9005 and any other control; various circuits 9531 to 9539 are installed on the control circuit board 9530.

Generally, reel backlights implemented as white light emitting diodes are provided for illuminating the symbols on the reels from behind to project the symbols onto the display windows.

The above structure is disclosed in JP-A-2001-353255 (see page 2 and FIG. 2).

SUMMARY OF THE INVENTION

However, if an attempt is made to dispose the liquid crystal display so that a part of the liquid crystal display overlaps the display window 9004, the reel 9003 representing the symbols exists just behind the display window 9004 and no liquid crystal backlight can be provided in the portion of the liquid crystal display corresponding to the display window 9004 and thus a reel backlight for illuminating the symbols on the reel 9003 from behind is used supplementally as a liquid crystal backlight. However, since the reel 9003 is circular in cross section, a black triangular region 9321 is produced between the reel 9003 and liquid crystal 9504 due to the fact that the inside of the machine is dark as shown in FIG. 15. The board support member 9520 on the side of the back of the display windows 9004 is white, but the width of the board support member 9520 can be taken only as a small width. If the width of the board support member 9520 is made large, a problem of breakage or failure occurs because of interference between the control circuit board 9530 and the member in the machine (for example, the reel 9003) when a door is opened or closed. Therefore, the black triangular region 9321 is inevitably produced, also as shown in FIG. 13. This problem is not involved in the gaming machine in the related art with no liquid crystal provided on the front of the display window 9004; however, if an attempt is made to provide liquid crystal 9504 on the front of the display window 9004, there occurs a problem that the background of the liquid crystal 9504 becomes black in the presence of the black triangular region 9321, and the player can scarcely perceive color development of the liquid crystal 9504 with the black background.

Further, as shown in FIG. 15, there occurs a problem that in an area 9541 or 9543 distant from the reel 9003 on the liquid crystal 9504, color output relatively weakens as compared with that in a nearest part 9542 of the liquid crystal 9504 to the reel 9003.

If the same color is developed in all area of the liquid crystal 9504, it is also clarified that if the black shadow of the black triangular region 9321 is cast over the liquid crystal 9504, the liquid crystal area over which the black shadow is cast produces relatively dark display.

It is therefore an object of the invention to provide a gaming machine that provides an image displayed sharply even in an area for displaying symbols on reels through the area and enabling the player to clearly recognize the image and enjoy playing a game.

According to one aspect of the invention, there is provided a gaming machine including: a variable display means (for example, reels 3) configured to variably display a plurality of symbol rows each having a symbol placement face formed in a curved surface on which a plurality of symbols are placed; an image display means (for example, liquid crystal 504) being provided in front of and opposed to the variable display means and configured to display the symbols through a flat symbol transmission face and to display an image concerning a game; a symbol illumination means (for example, reel backlight 513) configured to illuminate the symbols; and an image display assistance means (for example, reel side reflector 320) being provided on a side of the variable display means to cover an area sandwiched between the symbol placement face and the symbol transmission face on a face on the side of the variable display means, and configured to assist image display of the image display means.

According to the configuration, in the area formed as the reel 3 is circular in cross section, namely, the area (image display assistance area) sandwiched between the symbol placement face and the symbol transmission face on the face on the side of the reel 3, display of the image is assisted with the image display assistance means as the background of the image display means, so that the player perceives color development in the area on the image display means with the image display assistance means as the background, the color development effect of the image can be enhanced with good energy efficiency, and the player can clearly recognize the image and enjoy playing a game.

According to another aspect of the invention, there is provided a gaming machine including: a variable display means (for example, reels 3) configured to variably display a plurality of symbol rows on which a plurality of symbols are placed; an image display means (for example, liquid crystal 504) being provided in front of the variable display means and configured to display an image concerning a game; a symbol illumination means (for example, reel backlight 513, fluorescent lamp 510, any other illumination light for illuminating the symbols from behind or from the front of the symbols) configured to illuminate the symbols; and an image display assistance means being provided on a side of the variable display means and configured to reflect light emitted from the symbol illumination means (for example, reel side reflector 320, white plate, and mirror plate disposed on the side of the variable display means) and to assist image display of the image display means.

According to the configuration, the light from the symbol illumination means provided for illuminating the symbols is reflected on the sides of the symbol rows and arrives directly or indirectly at the areas in front of the variable display means, so that the image in front of the variable display means is illuminated for improving color development of the image in front of the variable display means, the illumination effect of the image can be enhanced with good energy efficiency, and the player can clearly recognize the image and enjoy playing a game.

In the gaming machine of the invention, the symbol illumination means may include a rear illumination lamp (for example, reel backlight 513) for illuminating the symbols from behind the symbols and the image display assistance means may reflect light emitted from the rear illumination lamp.

According to the configuration, not only the light emitted from behind the symbols to illuminate the symbols is applied to the image through the symbol row, but also the light leaked in the lateral direction is reflected on the side of the symbol row for illuminating the display area in front of the variable display means, so that full use of the light from the rear illumination lamp is made and the illumination effect can be enhanced with good energy efficiency.

In the gaming machine of the invention, the symbol illumination means may include a front illumination lamp (for example, fluorescent lamp 510) for illuminating the symbols from a slanting direction of the front of the symbols and the image display assistance means may reflect light emitted from the front illumination lamp.

According to the configuration, not only the light emitted from the slanting direction of the front of the symbols to illuminate the symbols is reflected on the symbol row for illuminating the image, but also the light leaked in the lateral direction is reflected on the side of the symbol row for illuminating the display area in front of the variable display means, so that full use of the light from the front illumination lamp is made and the illumination effect can be enhanced with good energy efficiency.

In the gaming machine of the invention, the image display assistance means may be attached to a housing (for example, reel case 310) for housing the variable display means.

According to the configuration, the image display assistance means is attached to the symbol row side, so that when the door is opened or closed, the image display assistance means does not becomes a hindrance and the door can be opened or closed without a hitch as compared with the case where the image display assistance means is attached to the door of the machine. The image display assistance means can also be disposed tightly along a triangular region and energy efficiency can be improved.

In the gaming machine of the invention, the image display assistance means may be a white plate.

According to the configuration, for example, a mold member can be used as the white place, so that the illumination effect can be enhanced at a low cost. White enables the player to well perceive color development.

In the gaming machine of the invention, the image display assistance means may be a mirror plate.

According to the configuration, a mirror plate has a good reflection efficiency, so that the illumination effect can be enhanced.

According to another aspect of the invention, there is provided a gaming machine including: a variable display means (for example, reels 3) configured to variably display a plurality of symbol rows on which a plurality of symbols are placed; an image display means (for example, liquid crystal 504) being provided in front of the variable display means and configured to display an image concerning a game; and a side illumination means (for example, side illumination light 1325) being provided on a side of the variable display means and configured to illuminate the symbols on the variable display means from a side of the symbols.

According to the configuration, the light emitted from the side of the symbol row arrives directly or indirectly at the display area in front of the variable display means, so that color development in the display area in front of the variable display means is improved, the illumination effect of the image can be enhanced, and the player can clearly recognize the image and enjoy playing a game.

DETAILED DESCRIPTION OF THE PREFERRED EMBODIMENTS

Hereinafter, preferred embodiments of the invention will be described with reference to the accompanying drawings.

First Embodiment

Figure 1:
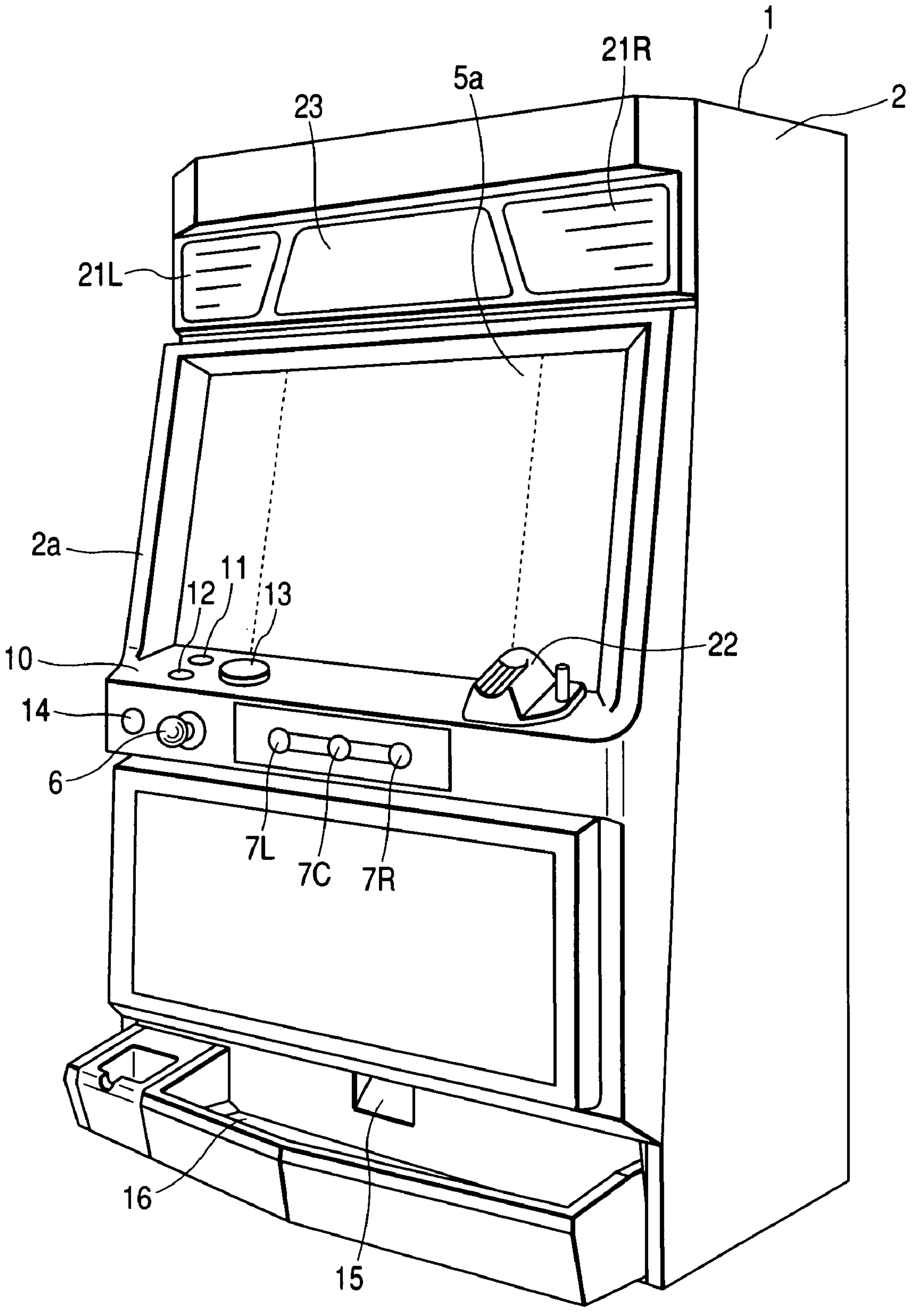
FIG. 1 is a drawing to show an embodiment of a gaming machine according to the invention and is a perspective view to show the appearance of a pinball slot machine as gaming machine.
Figure 2:
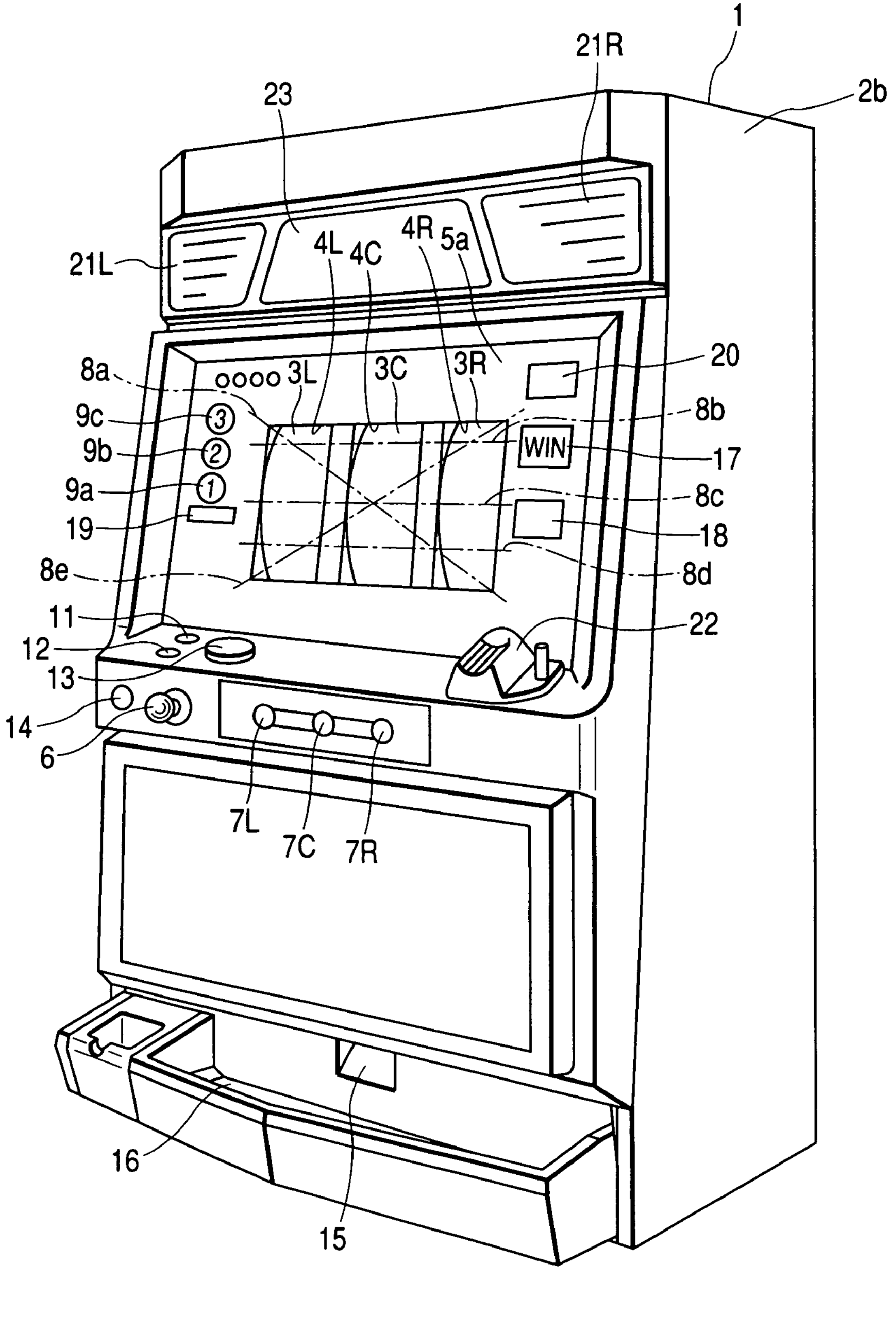
FIG. 2 is a perspective view to show the appearance of the pinball slot machine with reels displayed in the embodiment of the gaming machine according to the invention.

FIG. 1 shows a first embodiment applying a gaming machine according to the invention to a pinball slot machine (a so-called "Pachi-Slot machine" in Japan). FIG. 2 shows a state that a full screen display is not displayed by a liquid crystal display in display screen 5*a* and a member such as reels 3 disposed at the back of the liquid crystal are displayed through the display screen 5*a*.

A pinball slot machine 1 as a gaming machine is provided for the player to play a game using game medium such as a card storing information of the game play value given to the player as well as coins, medals and tokens. In the description that follows, it is assumed that the player uses medals.

In FIGS. 1 and 2, a panel display unit 2*a* disposed to form a substantially vertical plane is provided at the front of a cabinet 2 forming the whole of the pinball slot machine 1, and a liquid crystal display 5 (described later) having a rectangular 15-inch liquid crystal display screen 5*a* is provided on the front of the panel display unit 2*a*. An image can be displayed over the full face of the display screen 5*a*.

In the cabinet 2*b*, three reels (left reel 3L, center reel 3C, and right reel 3R) each with a symbol row including different types of symbols placed on the outer peripheral surface are provided in a row. The player can observe the symbols on the reels through the display windows 4L, 4C, and 4R. Each reel rotates at a constant speed (for example, 80 revolutions per minute).

Figure 3:
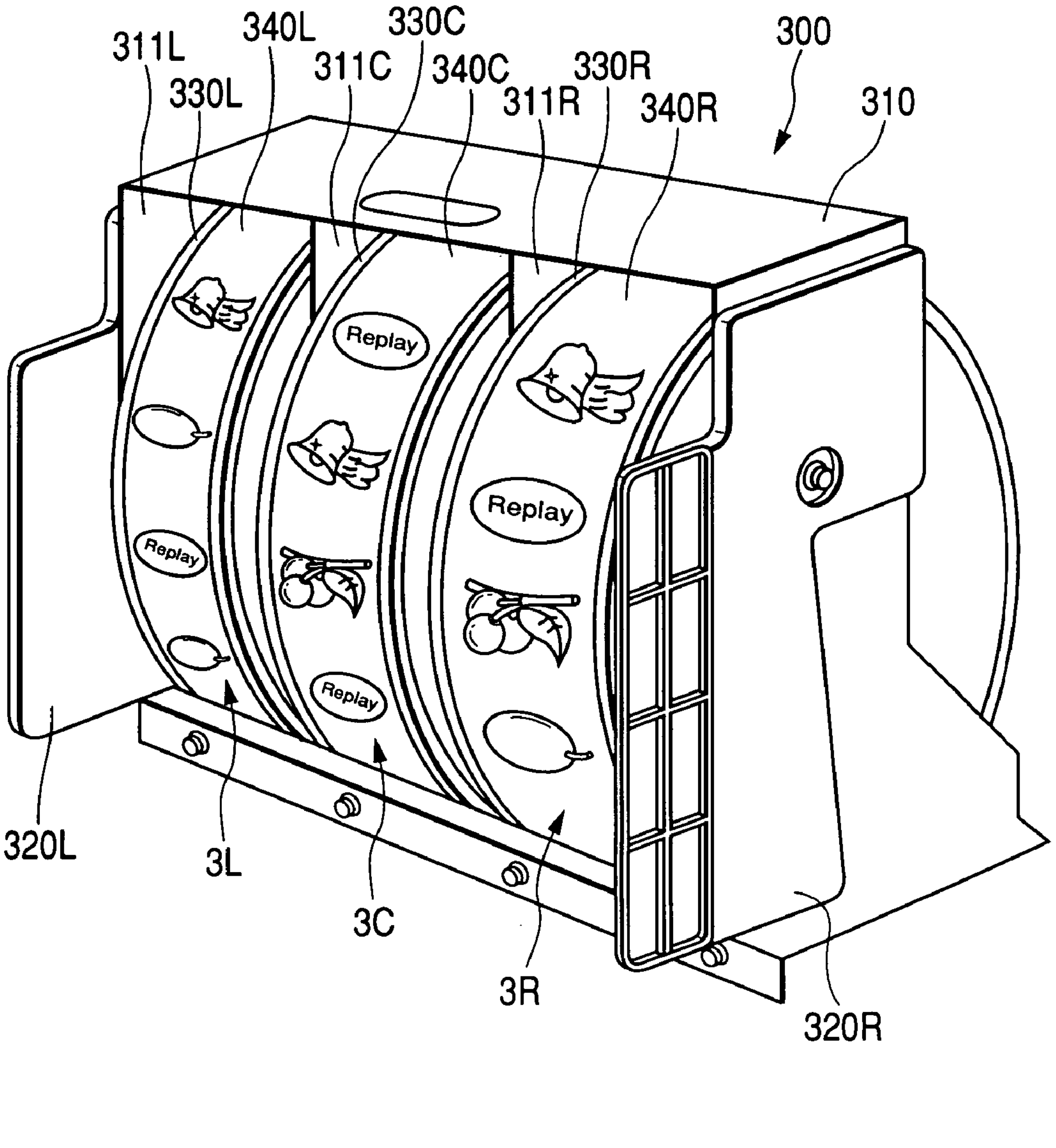
FIG. 3 is a perspective view to show reels, a reel case, and reel side reflectors attached to the reel case in the first embodiment of the gaming machine according to the invention.

The three reels 3L, 3C, and 3R are housed in a reel case 310, as shown in FIG. 3. Reel side reflectors 320L and 320R each made of a while plate molded are attached to the sides of the reel case 310 so that they are positioned on the sides of the reel row 3L, 3C, 3R. The reels 3L, 3C, and 3R have annular reel belts 340L, 340C, and 340R attached to annular reel wheels 330L, 330C, and 330R attached to brackets 311L, 311C, and 311R for rotation.

Figure 4:
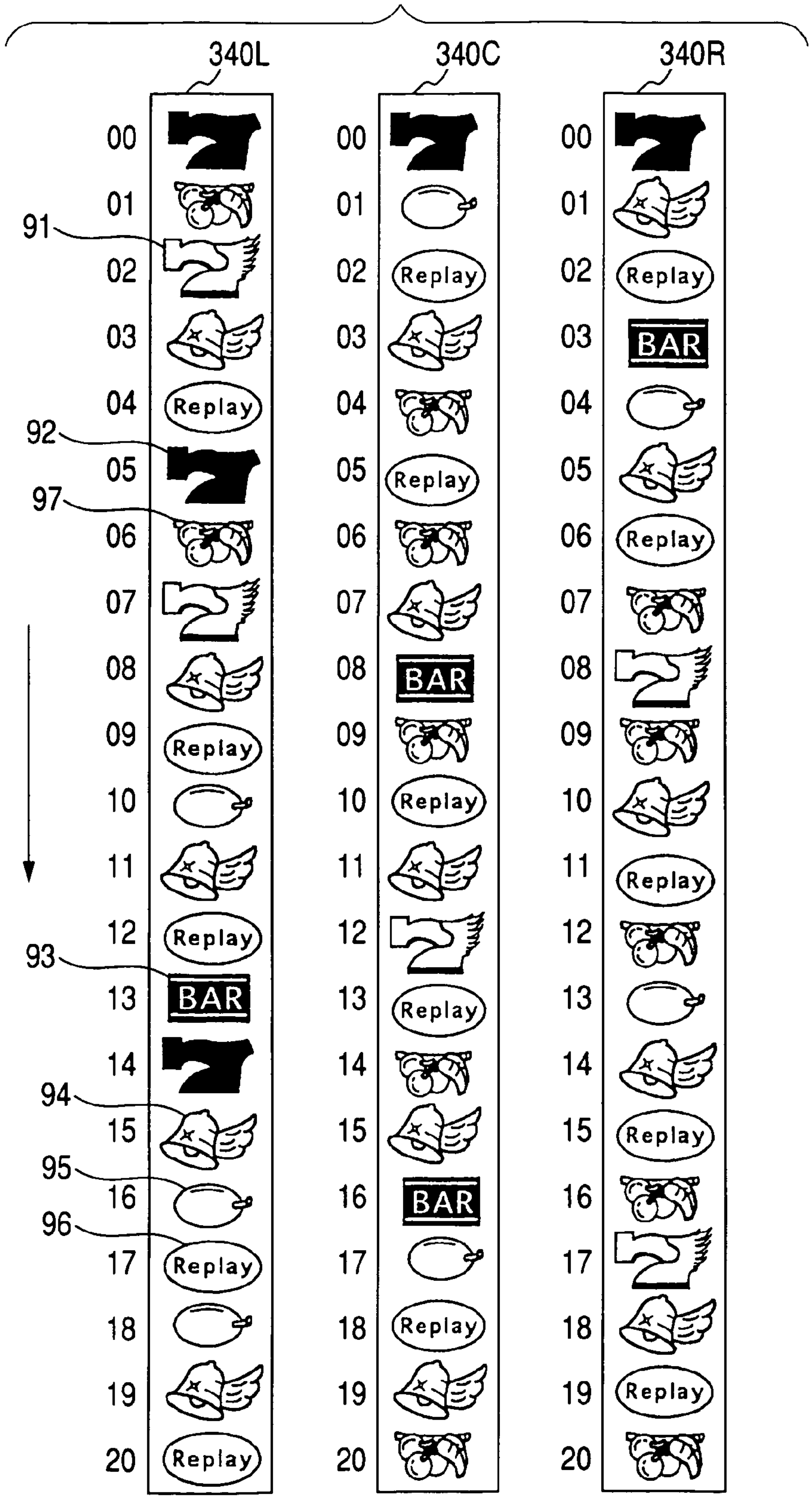
FIG. 4 is a drawing to show symbol rows drawn on the outer peripheral surfaces of the reels in the first embodiment of the gaming machine according to the invention.

FIG. 4 shows the reel belts 340L, 340C, and 340R on which symbol rows each made up of 21 symbols are printed. The symbols are given code numbers in a range from "00" to "20" and are stored in ROM 32 (shown in FIG. 10) described later as a data table. The symbol rows each made up of symbols of "blue 7 (symbol 91)," "red 7 (symbol 92)," "BAR (symbol 93)," "bell (symbol 94)," "plum (symbol 95)," "Replay (symbol 96)," and "cherry (symbol 97)" are represented on the reel belts 340L, 340C, and 340R. The symbol rows on the reel belts 340L, 340C, and 340R are rotated so as to move in the arrow direction in FIG. 4 for variably displaying means of the symbol rows.

Figure 5:
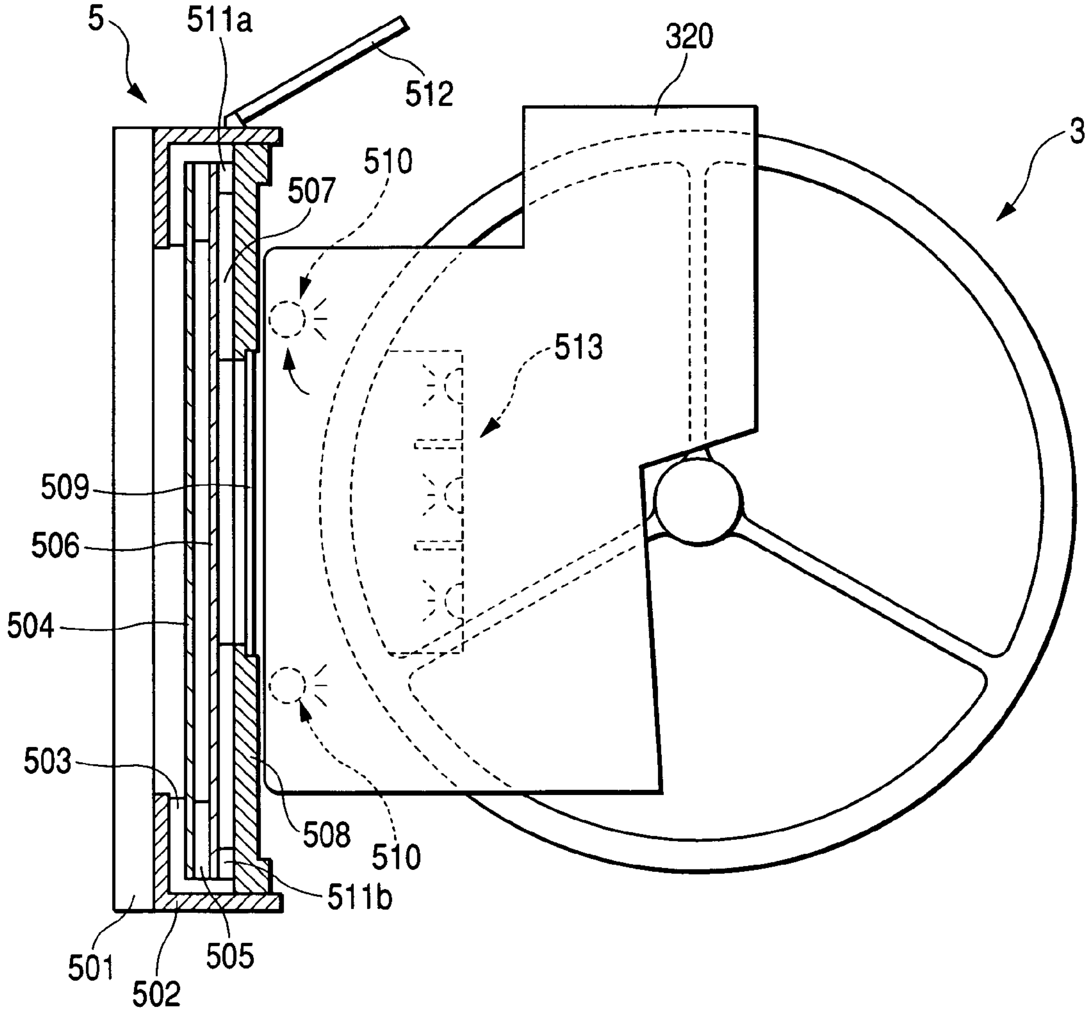
FIG. 5 is a drawing to show a reel, a liquid crystal display in front of the reel, and the reel side reflector in the first embodiment of the gaming machine according to the invention.
Figure 6:
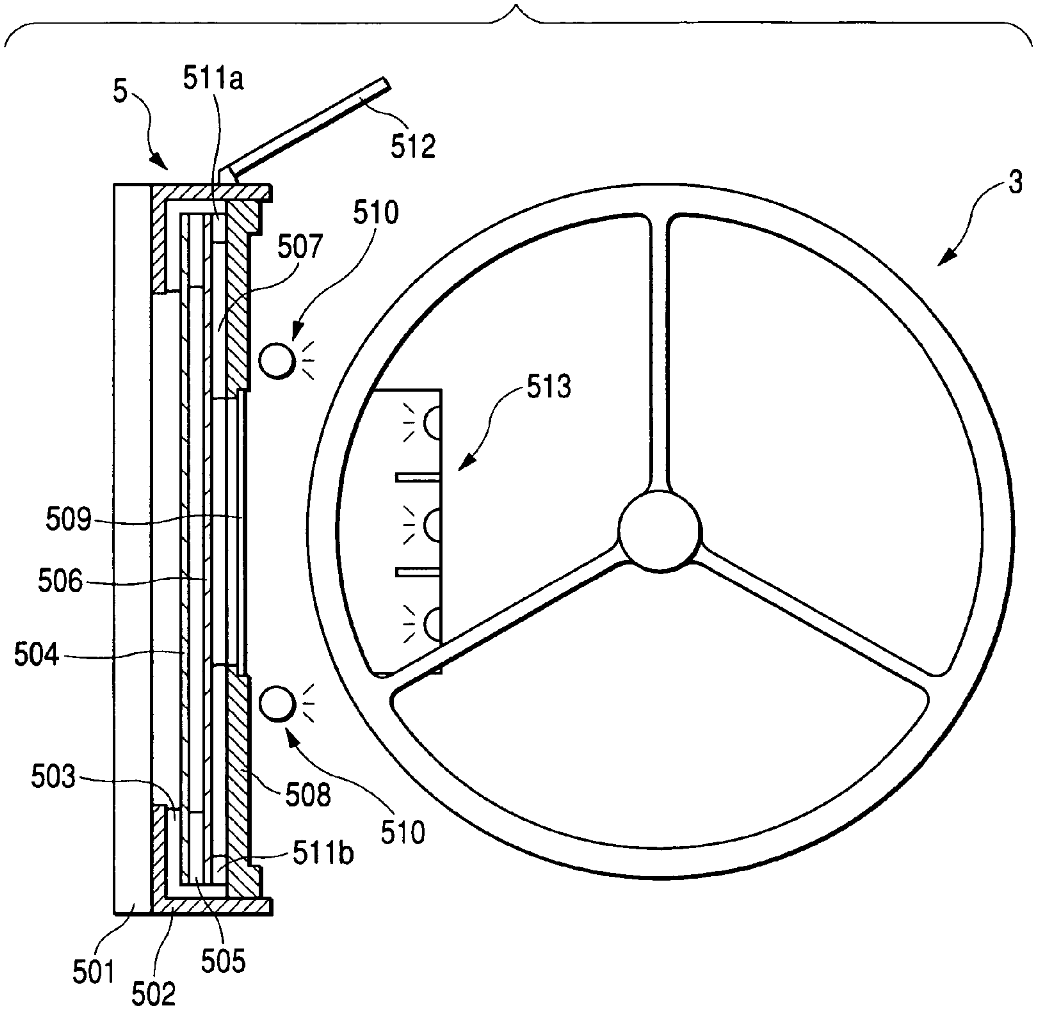
FIG. 6 is a drawing to show the reel and the liquid crystal display in front of the reel in the first embodiment of the gaming machine according to the invention.

The configuration of the liquid crystal display 5 is as shown in FIG. 5. FIG. 6 shows a state in which the reel side reflectors 320 are removed. In FIGS. 5 and 6, a transparent acrylic plate 501 is provided on the front of the liquid crystal display 5, followed by a reel glass base 502, a bezel metal frame 503, liquid crystal 504, a liquid crystal holder 505, a diffuser sheet 506, a light guide plate 507, a rear holder 508, and an antistatic sheet 509 which are stacked in order. A display driver 512 is disposed in the upper part of the liquid crystal display 5 for driving the liquid crystal 504 to display an image on the liquid crystal 504. The antistatic sheet 509 prevents dusts from being deposited on the portion corresponding to the reel window (display window).

The light guide plate 507 is a plate material subjected to special treatment (including laser beam machining) to uniformly reflect light on the back of a plate member such as an acrylic plate. The light guide plate 507 receives light of cold-cathode tube 511*a*, 511*b* used as liquid crystal backlight from the end face, reflects the light on the rear, and produces uniform surface light emission. The light guide plate 507 and the rear holder 508 are formed with vertically oriented rectangular display windows (4L, 4C, and 4R in FIG. 2). The display windows 4L, 4C, and 4R are visually observed through the liquid crystal display 5. Specifically, the symbols on the reels 3 are seen through the liquid crystal 504 within the frames of the display windows 4L, 4C, and 4R.

Figure 9:
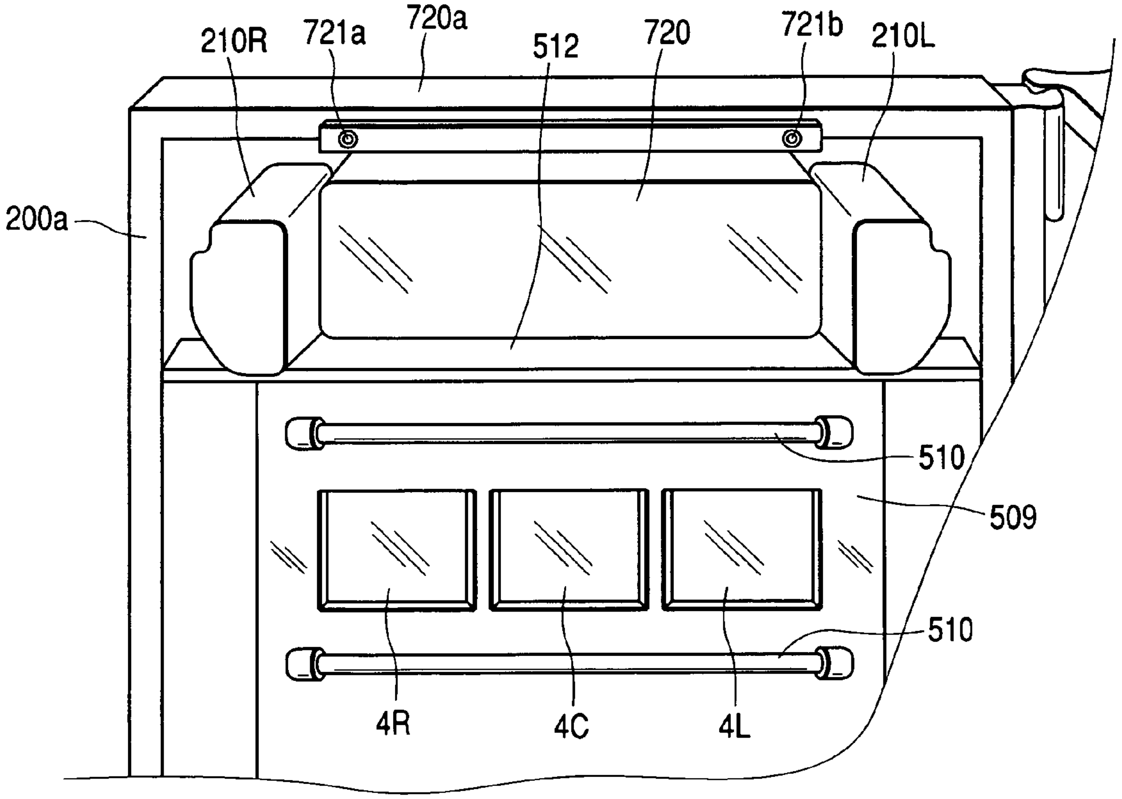
FIG. 9 is a drawing to show the back of a door in the first embodiment of the gaming machine according to the invention.

The cold-cathode tubes 511*a* and 511*b* are used as liquid crystal backlights for areas outside the frames of the display windows 4L, 4C, and 4R through the light guide plate 507. In contrast, three longitudinally arranged reel backlights 513 provided for each reel 3 are used as liquid crystal backlights for areas within the frames of the display windows 4L, 4C, and 4R. Two fluorescent lamps 510 disposed above and below the row of the display windows 4L, 4C, and 4R are also used as liquid crystal backlights for areas within the frames of the display windows 4L, 4C, and 4R, as also shown in FIG. 9. Further, the reel side reflectors 320 disposed on the sides of the reels 3 reflect light emitted from the reel backlights 513 and light emitted from the fluorescent lamps 510, and the light reflected by the reel side reflectors 320 is also applied to the liquid crystal in the areas within the frames of the display windows 4L, 4C, and 4R for illuminating the area. Particularly, each reel side reflector 320 is disposed along the triangular region in the gap between the reel 3 and the liquid crystal display 5. The length of the side of the reel side reflector 320 opposed to the liquid crystal display 5 is longer than the longitudinal length of the display window 4L, 4C, 4R and is longer than the spacing between the two fluorescent lamps 510.

Figure 7:
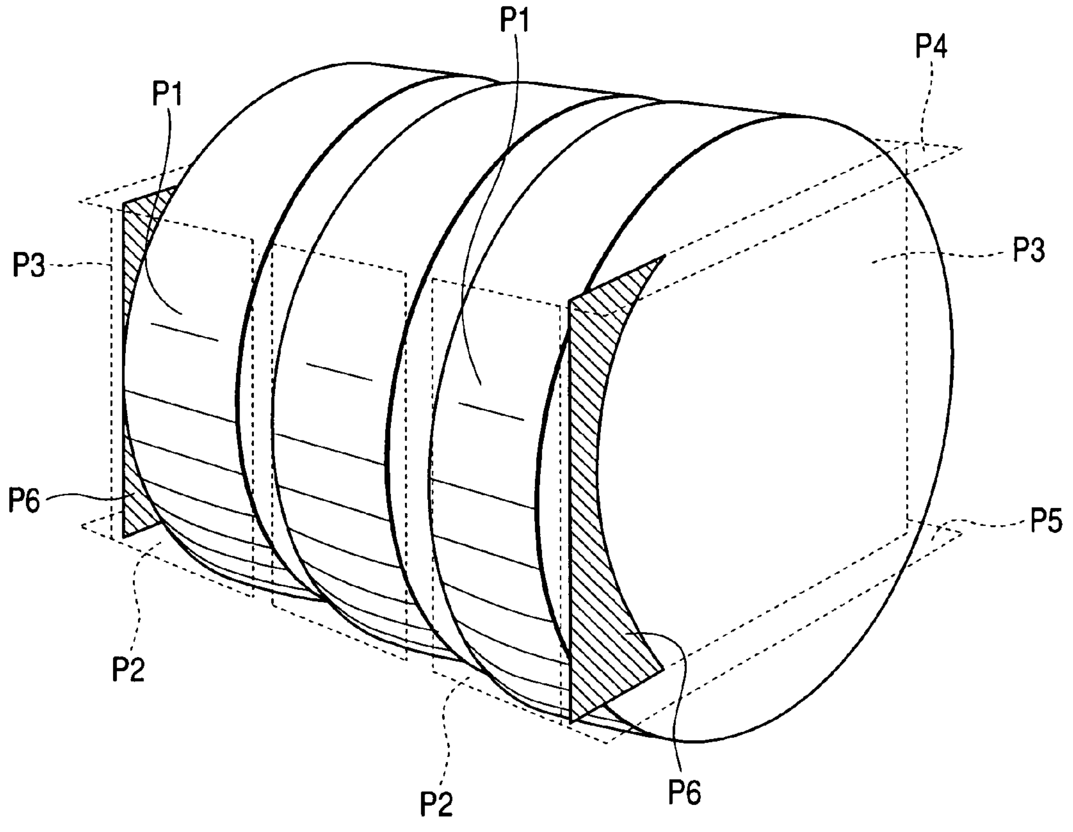
FIG. 7 is a schematic representation to show each symbol placement face of each reel, each symbol transmission face of liquid crystal, and each image display assistance area on a vertical face on the reel side in the first embodiment of the gaming machine according to the invention.

FIG. 7 shows an image display assistance area P6 covered with the reel side reflector 320. In FIG. 7, P1 indicates a symbol placement face of the front of the reel 3 on which the symbols are placed, P2 indicates a symbol transmission face, corresponding to the display window 4, for allowing the symbols to pass through in the liquid crystal 504, P3 indicates a vertical face at the position where the reel side reflector 320 is provided on the side of the reel 3, P4 indicates an upper parallel face containing the upper side of the symbol transmission face P2, and P5 indicates a lower parallel face containing the lower side of the symbol transmission face P2. The reel side reflector 320 in FIG. 3 covers the area P6 sandwiched between the symbol placement face P1 and the symbol transmission face P2 on the vertical face P3 on the side of the reel 3 (image display assistance area). More particularly, the reel side reflector 320 covers the image display assistance area P6 of the face formed by the symbol placement face P1, the symbol transmission face P2, the upper parallel face P4, and the lower parallel face P5 on the vertical face P3 on the side of the reel 3.

In the invention, considering the visual field of the player and the clearance required on installation between the members, it is not necessary to cover all of the logical area P6 as shown in FIG. 7 if the portion corresponds to the area beyond the visual field of the player on the liquid crystal 504, needless to say. In short, the reel side reflector 320 almost covers the gap on the side of the reel 3 on the background of the area within the visual field of the player on the liquid crystal 504, whereby color development of the liquid crystal 504 is perceived according to the color of the reel side reflector 320 (the reference color used as the reference of perception of color or monochrome, for example, white) for assisting image display of the liquid crystal 504.

Figure 8:
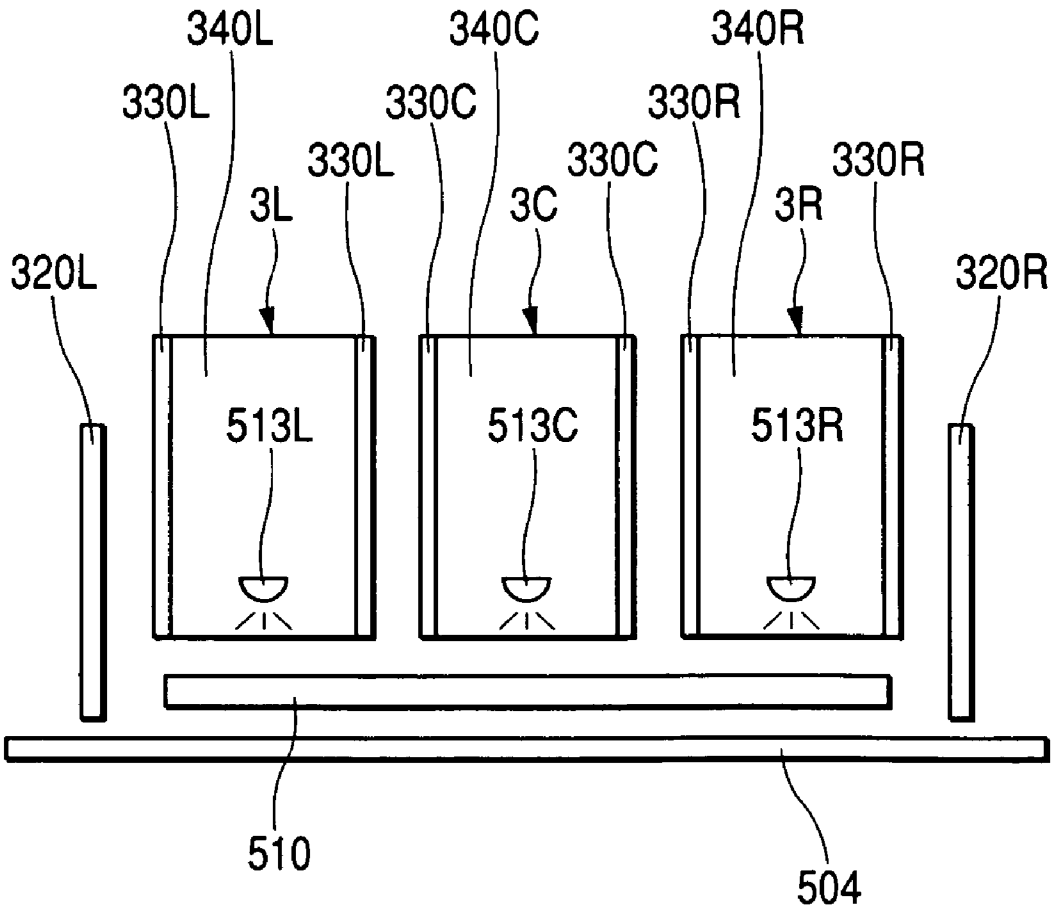
FIG. 8 is a drawing to show the positional relationships among the liquid crystal, the reels, the reel side reflectors, reel backlights, and a fluorescent lamp in the first embodiment of the gaming machine according to the invention.

FIG. 8 shows the positional relationships among the reels 3L, 3C, and 3R, the liquid crystal 504, the fluorescent lamp 510, the reel backlights 513L, 513C, and 513R, and the reel side reflectors 320L and 320R viewed from above. Specifically, the reel backlights 513L, 513C, and 513R illuminate the symbols on the reels 3L, 3C, and 3R from behind and also illuminate the areas within the frames of the display windows 4L, 4C, and 4R of the liquid crystal 504. The fluorescent lamps 510 illuminate the symbols on the reels 3L, 3C, and 3R from the slanting top and bottom of the front and also illuminate the liquid crystal in the areas within the frames of the display windows 4L, 4C, and 4R of the liquid crystal 504. Further, the reel side reflectors 320L and 320R reflect the light emitted from the reel backlights 513L, 513C, and 513R and the light emitted from the fluorescent lamps 510 for illuminating the symbols on the reels 3L, 3C, and 3R from the sides and also illuminating the liquid crystal in the areas within the frames of the display windows 4L, 4C, and 4R of the liquid crystal 504. More particularly, the light reflected by the reel side reflectors 320 includes not only the light directly reaching the reel side reflectors 320L and 320R from the reel backlights 513L, 513C, and 513R and the light directly reaching the reel side reflectors 320L and 320R from the fluorescent lamps 510, but also light transmitted or reflected on the reels 3L, 3C, and 3R and then reaching the reel side reflectors 320L and 320R.

Therefore, the images displayed in the areas within the frames of the display windows 4L, 4C, and 4R of the liquid crystal 504 are sharply displayed owing to the light arriving through the symbol rows (reel belts) on the reels 3L, 3C, and 3R from the reel backlights 513, the light arriving directly from the fluorescent lamps 510, the light arriving after reflected on the reel side reflectors 320L and 320R, and the light arriving after reflected on the symbol rows (reel belts) on the reels 3L, 3C, and 3R. Particularly, the light reflected on the reel side reflectors 320L and 320R and the light reflected on the reel side reflectors 320L and 320R and then further reflected on the symbol rows on the reels 3L, 3C, and 3R contribute to color development of the images in the areas of the liquid crystal 504 in front of the reels 3L, 3C, and 3R.

Next, the components involved in operation of the pinball slot machine 1 will be discussed with FIG. 2. The display windows 4L, 4C, and 4R are formed with a top line 8*b*, a center line 8*c*, and a bottom line 8*d* in the horizontal direction and a cross down line 8*a* and cross up line 8*e* in the slanting directions as pay lines. As the pay lines, one, three, or five lines are made activated as the player operates a 1-BET switch 11, a 2-BET switch 12, or a MAX-BET switch 13 (described later) or inserts medals into a medal insertion slot 22. Which pay lines are made activated is indicated as a BET lamp 9*a*, 9*b*, or 9*c* (described below) is lighted.

The 1-BET lamp 9*a*, the 2-BET lamp 9*b*, the MAX-BET lamp 9*c*, and a credit display unit 19 are provided on the left of the display windows 4L, 4C, and 4R. The 1-BET lamp 9*a*, the 2-BET lamp 9*b*, or the MAX-BET lamp 9*c* is lighted in response to the number of medals bet to play one game, which will be hereinafter referred to as the BET count.

In the embodiment, one game is over when all reels stop. When the BET count is 1 and one pay line is made activated, the 1-BET lamp 9*a* is lighted; when the BET count is 2 and three pay lines are made activated, the 2-BET lamp 9*b* is lighted; and when the BET count is 3 and all the five pay lines are made activated, the MAX-BET lamp 9*c* is lighted. The credit display unit 19 includes seven-segment LEDs for displaying the deposited number of medals.

The WIN lamp 17 and the payout display unit 18 are provided on the right of the display windows 4L, 4C, and 4R. The WIN lamp 17 is lighted when a specific winning game is complete. It is lighted at a predetermined probability when a specific internal winning is accepted. The payout display unit 18 includes seven-segment LEDs for displaying the number of medals paid out when the winning game is complete.

The bonus game information display unit 20 is provided in the upper right corner of the display screen 5*a* of the panel display unit 2*a*. The bonus game information display unit 20 includes seven-segment LEDs for displaying the number of times a predetermined game can be played, the possible number of times a specific game can be won.

As also shown in FIG. 1, a frontward projection portion 10 of a horizontal plane is formed below the display screen 5*a*. The display screen 5*a* displays not only the various lamps and the various display units, but also various effects of animation and the "operation order" required for realizing completion of the winning game when a predetermined internal winning is accepted.

The medal insertion slot 22 is provided at the right end of the frontward projection portion 10, and the 1-BET switch 11, the 2-BET switch 12, and the MAX-BET switch 13 are provided at the left end of the frontward projection portion 10. The 1-BET switch 11 enables the player to bet one of the credited medals by one push operation on a game. The 2-BET switch 12 enables the player to bet two of the credited medals by one push operation on a game. The MAX-BET switch 13 enables the player to bet as many medals as the maximum number of medals that can be bet on a game by one push operation. As the player operates any of the BET switches, the corresponding pay lines are made activated as described above.

A C/P switch 14 for the player to switch between credit and payout of the medals obtained by playing games by pushbutton operation is provided on the left of the front of the frontward projection portion 10. As the C/P switch 14 is switched, medals are paid out from a medal payout opening 15 in a lower part of the front and are stored in a medal reception tray 16.

On the right of the C/P switch 14, a start lever 6 for rotating the reels for starting variable display of symbols in the display windows 4L, 4C, and 4R (starting a game) as the player operates the start lever 6 is attached so that it can be turned in a predetermined angle range.

The speakers 21L and 21R are provided on the upper left and right of the cabinet 2, and a payout table panel 23 for displaying winning symbol combination, the number of payout medals, and the like is provided between the two speakers 21L and 21R.

Three stop buttons (left stop button 7L, center stop button 7C, and right stop button 7R) as operation buttons contained in stop operation means for stopping rotation of the three reels 3L, 3C, and 3R are provided at the center of the front of the frontward projection portion 10 and below the display screen 5*a*.

In the embodiment, the stop operation performed by the player pushing the first stop button when all reels rotate is called "first stop operation," the stop operation next performed by the player pushing the second stop button is called "second stop operation," and the stop operation performed by the player pushing the third stop button following the second stop operation is called "third stop operation."

Since the pinball slot machine of the embodiment is provided with the three stop buttons 7L, 7C, and 7R, there are six different operation orders of the stop buttons. The operation orders are distinguished from each other as follows: The left stop button 7L is abbreviated to "left," the center stop button 7C to "center," and the right stop button 7R to "right."

To indicate the operation order, the abbreviations of the stop buttons 7L, 7C, and 7R are listed from left to right in the stop operation order. For example, when the player operates the left stop button 7L as the first stop operation, the center stop button 7C as the second stop operation, and the right stop button 7R as the third stop operation, the operation order is indicated as "left center right." In the embodiment, the six different operation orders of "left center right," "left right center," "center left right," "center right left," "right left center," and "right center left" are available.

The configuration of a part of the rear of a door of the cabinet 2 is as shown in FIG. 9. In FIG. 9, a liquid crystal display control board 720*a* for controlling display of the liquid crystal display 5 is housed in a transparent resin case 720 and is attached to the rear of a door 200*a* of the cabinet 2 (a part of the cabinet), namely, an upper frame part of the door 200*a* with screws 721*a*, 721*b*. Liquid crystal display parts including an antistatic sheet 509 and a display driver 512 of the liquid crystal display 5 are disposed below the liquid crystal display control board 720*a*. Semitransparent covers 210L and 210R for covering speakers 21L and 21R are placed at the left and right of the resin case 720.

Figure 10:
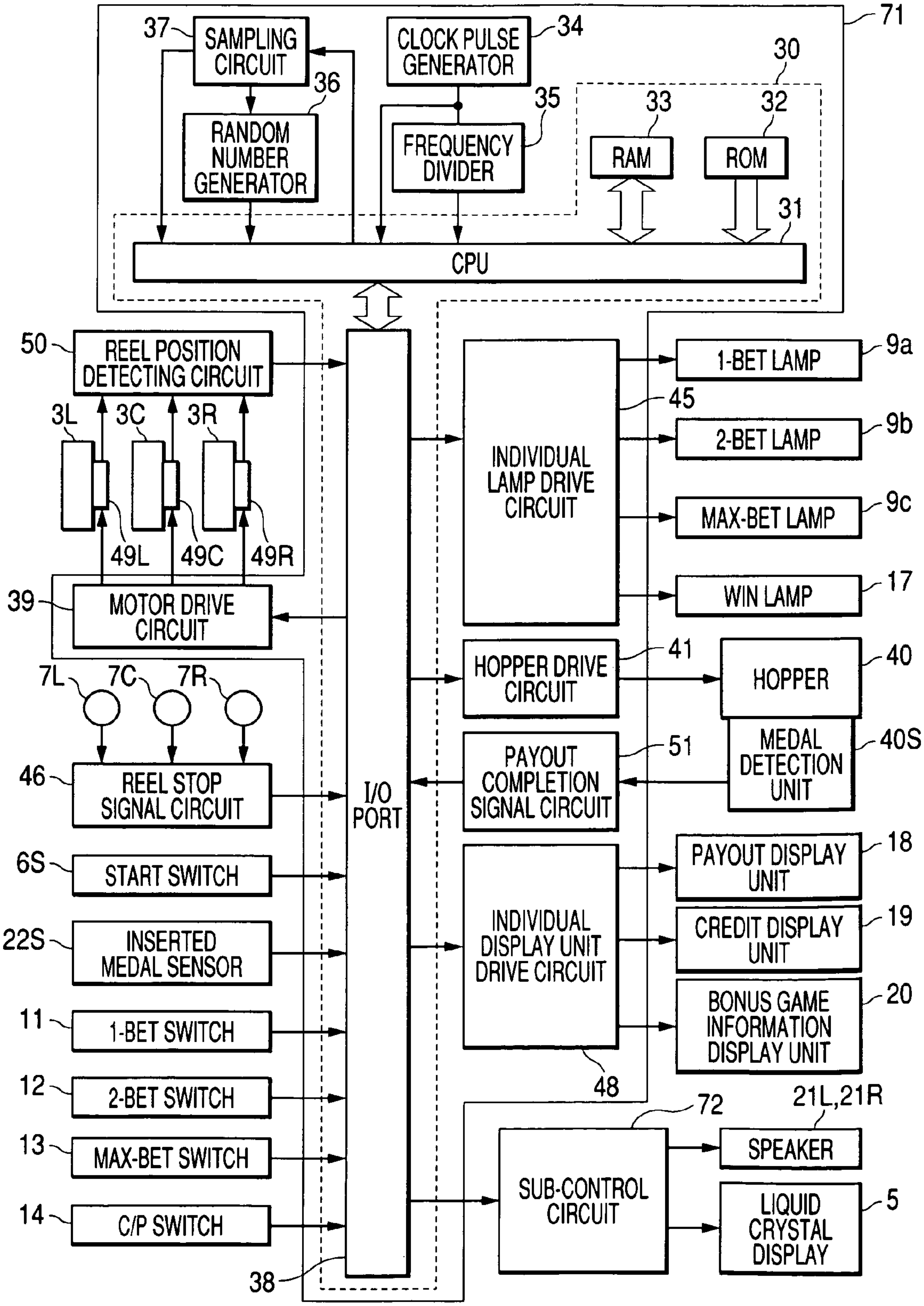
FIG. 10 is a block diagram to show the configuration of a main control circuit in the first embodiment of the gaming machine according to the invention.

FIG. 10 shows the circuit configuration including the above-mentioned main control circuit 71 (contained in internal lottery means) for controlling the game processing operation of the pinball slot machine, peripherals (actuators) electrically connected to the main control circuit 71, and a sub-control circuit 72 (contained in control means) for controlling the liquid crystal display 5 and the speakers 21L and 21R based on a control command transmitted from the main control circuit 71.

The main control circuit 71 includes the microcomputer 30 placed on the circuit board as the main component and a random number sampling circuit. The microcomputer 30 includes a CPU 31 for performing the control operation in accordance with a preset program, and ROM 32 and RAM 33, both of which are provided as a storage.

Connected to the CPU 31 are a clock pulse generation circuit 34 for generating a reference clock pulse, a frequency divider 35, a random number generator 36 for generating sampled random numbers, and a sampling circuit 37.

For sampling random numbers, random number sampling may be executed in the microcomputer 30, namely, the operation program of the CPU 31. In this case, the random number generator 36 and the sampling circuit 37 can be omitted or can also be left for backup of the random number sampling operation.

The ROM 32 of the microcomputer 30 stores probability lottery tables used to determine random number sampling performed each time the player operates the start lever 6 (start operation), stop control tables for determining the reel stop mode in response to operation of the stop buttons, and various control commands to be transmitted to the sub-control circuit 72.

The sub-control circuit 72 does not input commands and information to the main control circuit 71 and one-way communications are conducted from the main control circuit 71 to the sub-control circuit 72.

In the circuitry in FIG. 10, the main actuators whose operation is controlled by a control signal from the microcomputer 30 include the various lamps (1-BET lamp 9*a*, 2-BET lamp 9*b*, MAX-BET lamp 9*c*, and WIN lamp 17), the various display units (payout display unit 18, credit display unit 19, and bonus game information display unit 20), a hopper (containing a drive section for paying out medals) 40 as game play value giving means for storing medals and paying out a predetermined number of medals according to an instruction of a hopper drive circuit 41, and stepping motors 49L, 49C, and 49R for rotating the reels 3L, 3C, and 3R.

Further, a motor drive circuit 39 for driving and controlling the stepping motors 49L, 49C, and 49R, a hopper drive circuit 41 for driving and controlling the hopper 40, an individual lamp drive circuit 45 for driving and controlling the various lamps, and an individual display unit drive circuit 48 for driving and controlling the various display units are connected to the output section of the CPU 31 through an I/O port 38. Each of these drive circuits receives a control signal such as a drive command output from the CPU 31 and controls the operation of the corresponding actuator.

The main input signal generation means for generating an input signal required for generating a control command by the microcomputer 30 include a start switch 6S, the 1-BET switch 11, the 2-BET switch 12, the MAX-BET switch 13, the C/P switch 14, an inserted medal sensor 22S, a reel stop signal circuit 46, a reel position detecting circuit 50, and a payout completion signal circuit 51. These are also connected to the CPU 31 through the I/O port 38.

The start switch 6S detects the operation of the start lever 6 operated by the player. The inserted medal sensor 22S detects a medal inserted to the medal insertion slot 22. The reel stop signal circuit 46 generates a stop signal as the player operates each stop button 7L, 7C, 7R. The reel position detecting circuit 50 receives a pulse signal from a reel rotation sensor and supplies a signal for detecting the position of each reel 3L, 3C, 3R to the CPU 31. The payout completion signal circuit 51 generates a signal for detecting completion of medal payout when the count of a medal detection unit 40S (the number of medals paid out from the hopper 40) reaches the specified number of medals.

In the circuitry in FIG. 10, the random number generator 36 generates random numbers contained in a given numeric value range and the sampling circuit 37 samples one random number at the appropriate timing after the player starts the start lever 6. The CPU 31 determines the internal winning combination based on the random number thus sampled and the probability lottery table stored in the ROM 32. Therefore, the CPU 31 implements winning state determination means for determining the winning state of the game, namely, the internal winning combination by random number lottery.

After rotation of each of the reels 3L, 3C, and 3R is started, the number of drive pulses supplied to each of the stepping motors 49L, 49C, and 49R and the counts are written into a predetermined area of the RAM 33. A reset pulse is obtained every revolution of the reel 3L, 3C, 3R and the reset pulses are input to the CPU 31 through the reel position detecting circuit 50. The drive pulse counts written in the RAM 33 are cleared to "0" according to the reset pulses thus obtained. Accordingly, the counts corresponding to the rotation positions of the reels 3L, 3C, and 3R within the range of one revolution are stored in the RAM 33.

A symbol table is stored in the ROM 32 to relate the rotation positions of the reels 3L, 3C, and 3R and the symbols drawn on the outer peripheral surfaces of the reels to each other. In the symbol table, the code numbers given in sequence every given rotation pitch of each reel 3L, 3C, 3R based on the rotation position where the reset pulse is generated and the symbol codes indicating the symbols provided in one-to-one correspondence with the code numbers are related to each other.

Further, a winning symbol combination table is stored in the ROM 32. The winning symbol combination table lists the symbol combinations of winning games, the numbers of payout medals for the winning games, and the winning game determination codes representing the winning games in association with each other. The winning symbol combination table is referenced at the stop control time of the left reel 3L, the center reel 3C, the right reel 3R and when the winning game is confirmed after all reels are stopped.

If the internal winning is accepted according to lottery processing based on the random number sampling (probability lottery processing), the CPU 31 sends the stop control signal of the reels 3L, 3C, and 3R to the motor drive circuit 39 based on the operation signal sent from the reel stop signal circuit 46 at the timing at which the player operates the stop buttons 7L, 7C, and 7R, and the selected stop control table. The CPU 31 functions as stop control means for performing stop control of the reels 3L, 3C, and 3R.

When the player pushes the stop button 7L, 7C, 7R, the stop control table is referenced and is used to determine the stop position of the reel.

Specifically, when the player pushes the stop button 7L, 7C, 7R, the symbol positioned on the center line 8*c* on the reel corresponding to the operated stop button (specifically, the symbol whose center is positioned above the center line 8*c* and is nearest to the position of the center line 8*c*) is detected, the code number of the symbol (operation position) is collated with the stop control table, and the code number of the symbol to be stopped at the position of the center line 8*c* (stop position) is determined.

In the stop mode indicating completion of the winning game of internal winning combination, the CPU 31 supplies a payout command signal to the hopper drive circuit 41 for paying out a predetermined number of medals to the player from the hopper 40.

At the time, the medal detection unit 40S counts the number of medals paid out from the hopper 40. When the count reaches the specified number of medals, a medal payout completion signal is input to the CPU 31, which then stops driving the hopper 40 through the hopper drive circuit 41 and terminates the medal payout processing.

Figure 11:
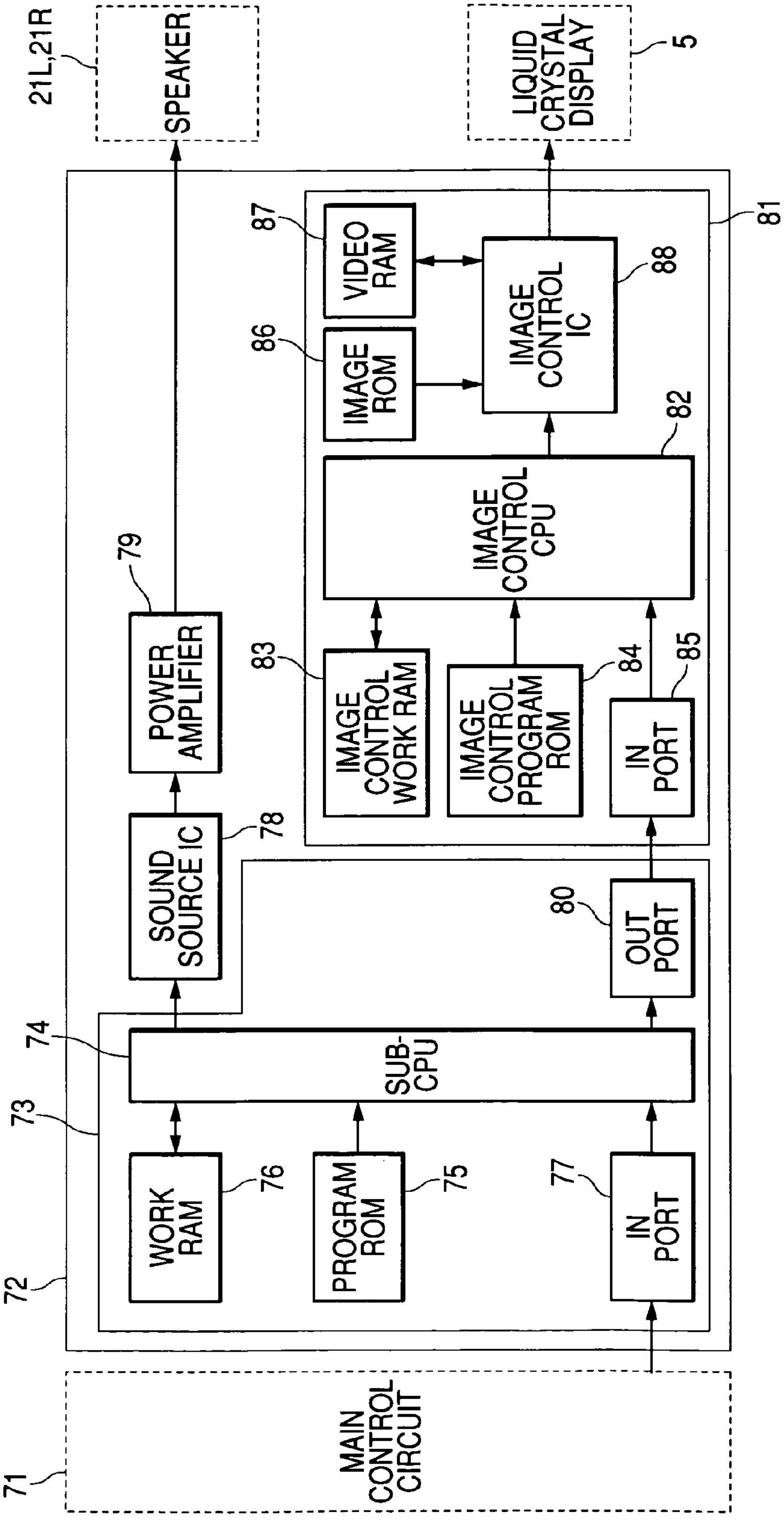
FIG. 11 is a block diagram to show the configuration of a sub-control circuit in the first embodiment of the gaming machine according to the invention.

FIG. 11 shows the configuration of the sub-control circuit 72. The sub-control circuit 72 performs display control of the liquid crystal display 5 and output control of sound from the speakers 21L and 21R based on the control commands from the main control circuit 71. The sub-control circuit 72, which is implemented on a separate circuit board from the circuit board implementing the main control circuit 71, includes a microcomputer (sub-microcomputer) 73 as the main component, an image control circuit 81 as display control means of the liquid crystal display 5, a sound source IC 78 for controlling sound output from the speakers 21L and 21R, and a power amplifier 79.

The sub-microcomputer 73 includes a sub-CPU 74 for performing the control operation following a control command transmitted from the main control circuit 71, program ROM 75 as a storage, and work RAM 76. The signal from the main control circuit 71 to the sub-microcomputer 73 is input through an IN port 77, and the signal to the image control circuit 81 is output through an OUT port 80.

The sub-control circuit 72 does not include a clock pulse generation circuit, a frequency divider, a random number generator, or a sampling circuit, but executes random number sampling in an operation program of the sub-CPU 74. Generation of the assistance time period is determined as the random number sampling is executed.

The sub-CPU 74 includes the number-of-AT-sets counter and a number-of-AT-games counter. The number-of-AT-sets counter stores the number of sets. The number-of-AT-games counter stores information concerning the number of games in one assistance time period.

The program ROM 75 stores a control program executed in the sub-CPU 74. The work RAM 76 is used as a temporary storage for the sub-CPU 74 to execute the control program.

The image control circuit 81 includes an image control CPU 82, an image control work RAM 83, image control program ROM 84, image ROM 86, video RAM 87, and an image control IC 88. The image control CPU 82 determines the display contents on the liquid crystal display 5 in accordance with an image control program stored in the image control program ROM 84 based on the parameters set in the sub-microcomputer 73. The signal from the sub-CPU 74 is input through an IN port 85.

The image control program ROM 84 stores the image control program involved in display on the liquid crystal display 5 and various selection tables. The image control work RAM 83 is used as a temporary storage for the image control CPU 82 to execute the image control program. The image control IC 88 forms an image responsive to the display contents determined by the image control CPU 82 and outputs the image to the liquid crystal display 5. The image ROM 86 stores dot data for forming an image. The video RAM 87 is used as a temporary storage for the image control IC 88 to form an image.

On the other hand, the sub-CPU 74 displays an image on the liquid crystal display 5 based on the command signal from the CPU 31.

Specifically, whenever a stop signal is input from the reel stop signal circuit 46 as the player operates the start lever 6 or the stop button 7L, 7C, 7R, the sub-CPU 74 transmits a signal to the image control CPU 82 and displays an image on the display screen 5*a* of the liquid crystal display 5.

The effect image displayed on the liquid crystal display 5 by the image control CPU 82 is displayed only outside the frame of the display window 4 for allowing the player to visually check the symbols on the reel 3 within the frame of the display window 4 at times; the effect image is also displayed within the frame of the display window 4 for allowing the player to visually check the symbols on the reel 3 within the frame of the display window 4 at times; or the effect image is displayed so as to cover all the symbols on the reel 3 within the frame of the display window at times. Therefore, the player can visually check the symbols on the reel 3 clearly within the frame of the display window 4 and can also visually check the effect image displayed over the full face of the rectangular 15-inch liquid crystal screen.

As described above, the gaming machine of the first embodiment of the invention includes the reels 3 (contained in variable display means) having symbol placement faces shaped like curved surfaces on which a plurality of symbols are placed for variably displaying of a plurality of symbol rows each made up of the plurality of symbols, the liquid crystal 504 (contained in image display means) being provided in front of and opposed to the reels 3 for displaying the symbols through a flat symbol transmission face and also displaying an image concerning game play, the reel backlights 513 (contained in symbol illumination means) for illuminating the symbols, and the reel side reflectors 320 (contained in image display assistance means) each being provided on a side of the reels 3 for covering an area sandwiched between the symbol placement face and the symbol transmission face on a face on the side of the reels 3 for assisting image display of the liquid crystal 504 (image display means). Thus, in the area formed as the reel 3 is circular in cross section, namely, the image display assistance area sandwiched between the symbol placement face and the symbol transmission face on the vertical face on the side of the reel 3, image display is assisted with the reel side reflector 320 as the background, so that the player perceives color development in the area on the liquid crystal 504 with the reel side reflector 320 as the background, the color development effect of the effect image can be enhanced with good energy efficiency, and the player can clearly recognize the effect image and enjoy playing a game.

The gaming machine of the first embodiment of the invention includes the reels 3 (contained in variable display means) for variably displaying of a plurality of symbol rows each made up of a plurality of symbols, the liquid crystal 504 (contained in image display means) being provided in front of the reels 3 for displaying an image concerning game play, the reel backlights 513 (contained in symbol illumination means) for illuminating the symbols, and the reel side reflectors 320 (contained in image display assistance means) being provided on sides of the reels 3 for reflecting light emitted from the reel backlights 513. Thus, the light from the illumination light provided for illuminating the symbols is reflected on the sides of the symbol rows and arrives directly or indirectly at the areas in front of the reels 3, so that the image in front of the variable display means is illuminated for improving color development of the image within the frame of the display window, the illumination effect of the effect image can be enhanced with good energy efficiency, and the player can clearly recognize the effect image and enjoy playing a game.

The fluorescent lamps 510 (contained in symbol illumination means) for illuminating the symbols from the slanting direction of the front of the symbols are provided and the reel side reflectors 320 reflect light emitted from the fluorescent lamps 510, so that the illumination effect of the effect image can be furthermore enhanced with good energy efficiency.

The reel side reflectors 320 are attached to the reel case 310 (contained in housing) for housing the reels 3, so that when the door is opened or closed, the image display assistance means does not becomes a hindrance and the door can be opened or closed without a hitch as compared with the case where the image display assistance means corresponding to the reel side reflector 320 is attached to the door of the machine.

In the description of the embodiment, the white plate that can be molded, can enhance the illumination effect at a low cost, and produces the image perception effect is used as the reel side reflector 320. In the invention, however, a mirror plate or any other reflection member having a good reflection efficiency may be used as the reel side reflector 320.

Second Embodiment

Figure 12:
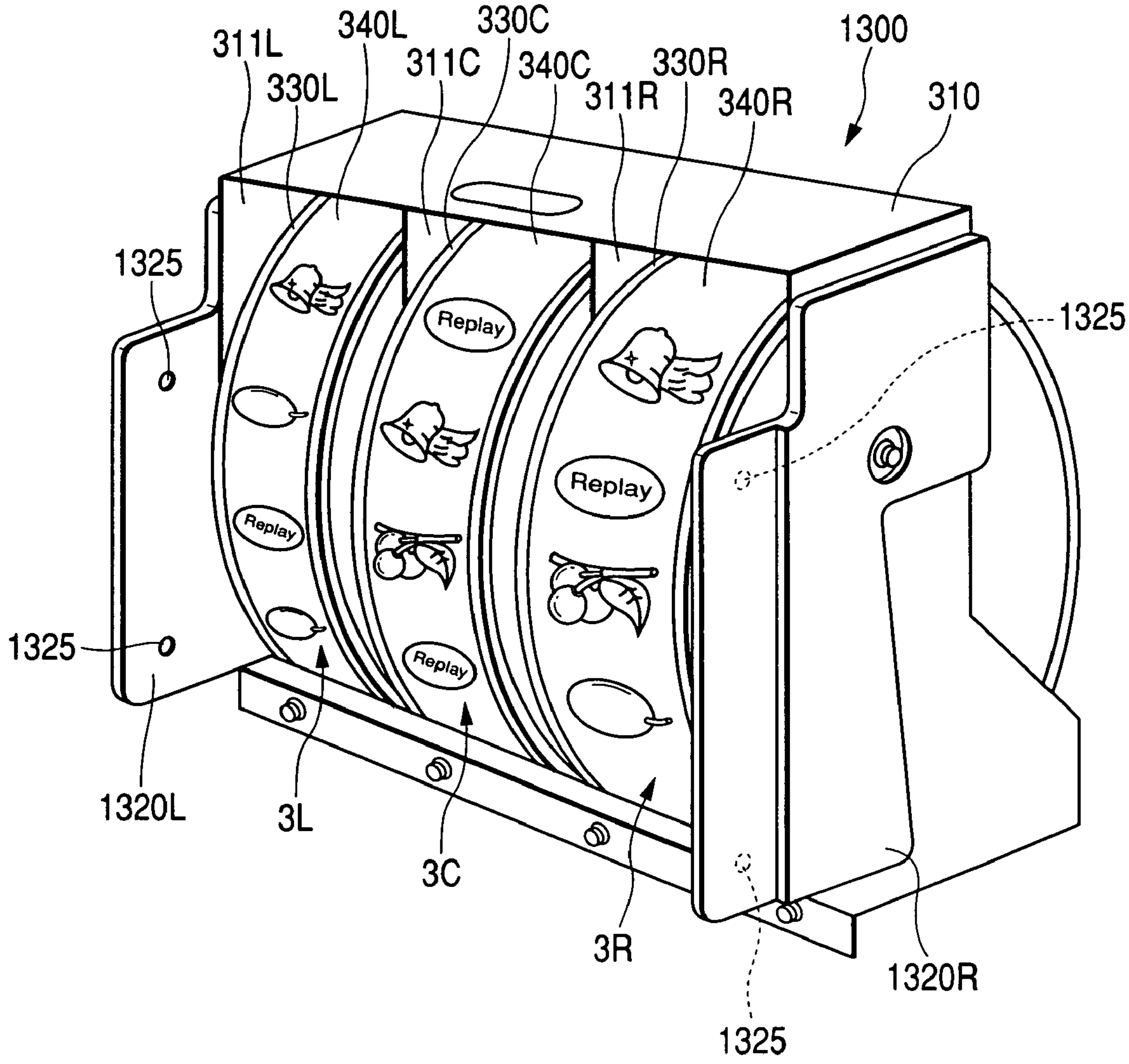
FIG. 12 is a drawing to show side illumination lights in a second embodiment of a gaming machine according to the invention.
Figure 13:
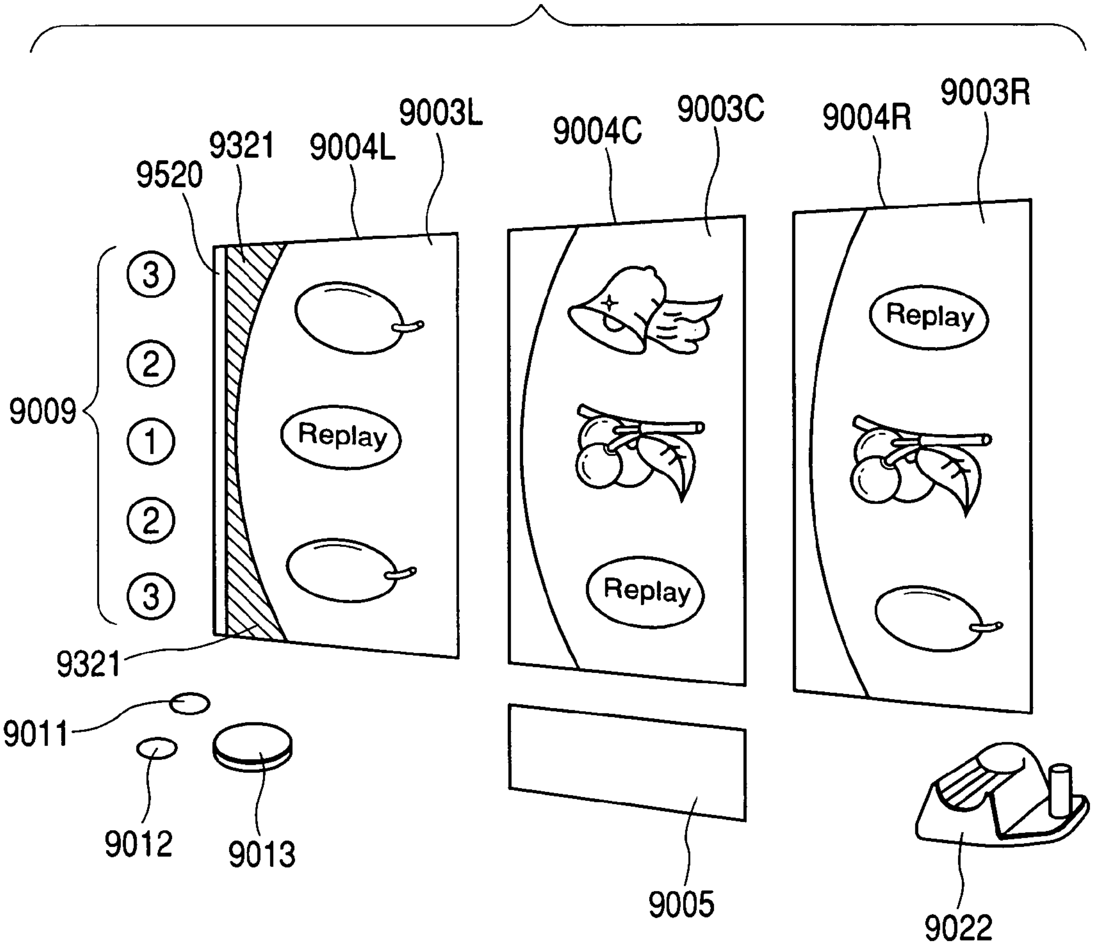
FIG. 13 is a perspective view of the front to show a part of a gaming machine in a related art.
Figure 14:
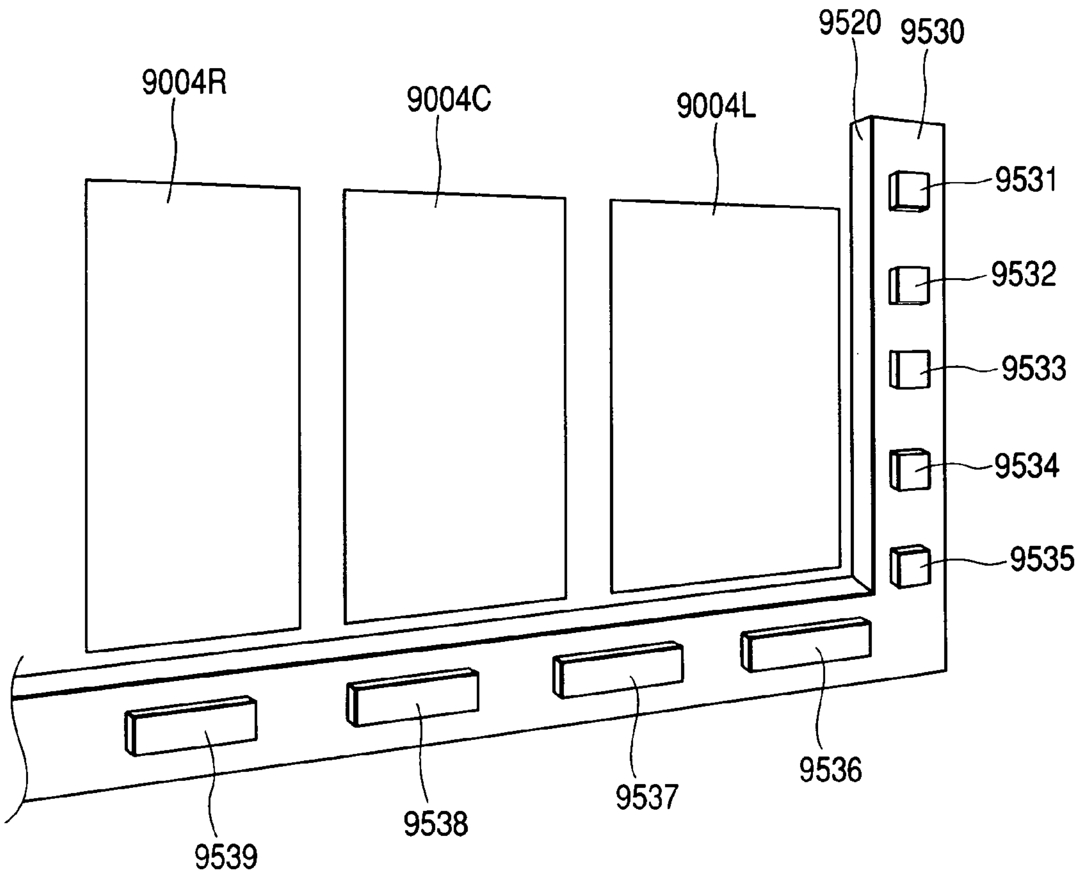
FIG. 14 is a perspective view of the door back to show a part of the gaming machine in the related art.
Figure 15:
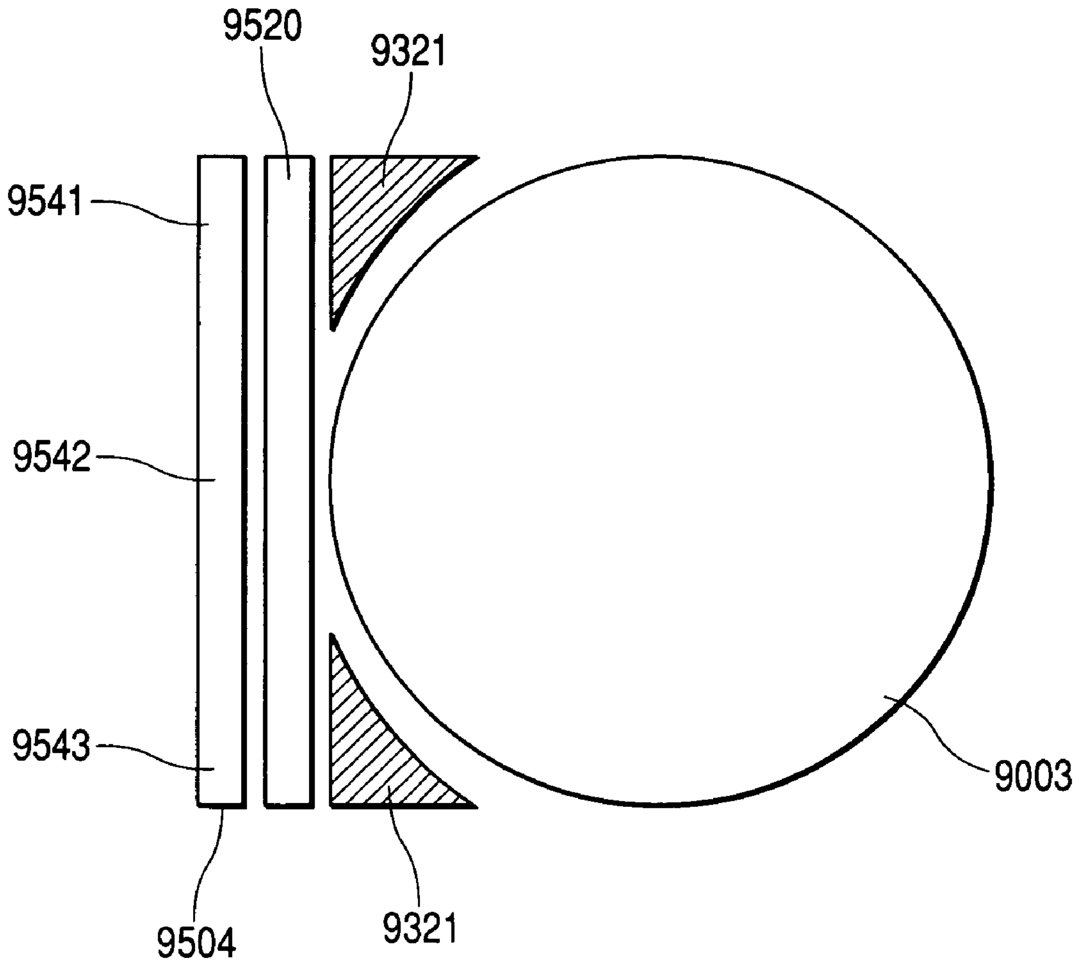
FIG. 15 is a schematic representation to describe the effect of a triangular region if liquid crystal is simply provided in front of a reel for the gaming machine in the related art.

FIG. 12 shows a reel means 1300 in a gaming machine of a second embodiment of the invention. Components identical with those of reel means 300 previously described with reference to FIG. 3 are denoted by the same reference numerals in FIG. 12. Side illumination lights 1325 each implemented, for example, as a white light emitting diode are provided on the sides in front of reels 3L, 3C, and 3R for illuminating symbols on the front of the reels 3L, 3C, and 3R from the sides and also illuminating liquid crystal 504 from the rear sides. Side plates 1320L and 1320R are attached to the sides of a reel case 310 for holding the side illumination lights 1325.

As the side plate 1320L, 1320R, a member for reflecting light may be used like the reel side reflector 320 in FIG. 3. It is advisable to use a white member for causing the player to perceive color development of an image.

As described above, the gaming machine of the second embodiment of the invention includes the reels 3 (contained in variable display means) for variably displaying of a plurality of symbol rows each made up of a plurality of symbols, the liquid crystal 504 (contained in image display means) being provided in front of the reels 3 for displaying an image concerning game play, and the side illumination lights 1325 (contained in side illumination means) being provided on the sides of the reels 3 for illuminating the symbols on the reels 3 from the sides. Thus, the light emitted from the side of the symbol row arrives directly or indirectly at the display area of the liquid crystal 504 in front of the reels 3, color development in the display area in front of the reels 3 is improved, the illumination effect of the effect image can be enhanced, and the player can clearly recognize the effect image and enjoy playing a game.

In the description of the embodiment, the side plates 1320L and 1320R are attached to the sides of the reel case 310, and the side illumination lights 1325 are attached to the side plates 1320L and 1320R. In the invention, however, they are attached in a different manner if the side illumination lights 1325 are disposed on the sides in front of the reels 3L, 3C, and 3R. For example, a plate may be attached to a position on the door and on a side in front of the reels 3L, 3C, and 3R and the plate on the door may hold white light emitting diodes.

Each side illumination light 1325 may be not only a white light emitting diode, but also any other illumination light such as a fluorescent lamp.

As described above, according to the invention, the gaming machine for making it possible to sharply display an image even in an area for displaying symbols on reels through the area and enabling the player to clearly recognize the image and enjoy playing a game can be provided.

Although only some exemplary embodiments of the invention have been described in detail above, those skilled in the art will readily appreciate that many modifications are possible in the exemplary embodiments without materially departing from the novel teachings and advantages of the invention. Accordingly, all such modifications are intended to be included within the scope of the invention.

This application is related to co-pending U.S. patent applications entitled “GAMING MACHINE” which was filed as U.S. patent application Ser. No. 10/697,942, “GAMING MACHINE” which was filed as U.S. patent application Ser. No. 10/697,946, “GAMING MACHINE” which was filed as U.S. patent application Ser. No. 10,967,244, “GAMING MACHINE” which was filed as U.S. patent application Ser. No. 10/697,441, “GAMING MACHINE” which was filed as U.S. patent application Ser. No. 10/697,249, “GAMING MACHINE” which was filed as U.S. patent application Ser.

No. 10/697,004, "GAMING MACHINE" which was filed as U.S. patent application Ser. No. 10/697,251, "GAMING MACHINE" which was filed as U.S. patent application Ser. No. 10/697,254, "GAMING MACHINE" which was filed as U.S. patent application Ser. No. 10/697,005, "GAMING MACHINE" which was filed as U.S. patent application Ser. No. 10/697,006, "GAMING MACHINE" which was filed as U.S. patent application Ser. No. 10/697,259, "GAMING MACHINE" which was filed as U.S. patent application Ser. No. 10/697,007, "GAMING MACHINE" which was filed as U.S. patent application Ser. No. 10/697,042, "GAMING MACHINE" which was filed as U.S. patent application Ser. No. 10/697,158, "GAMING MACHINE" which was filed as U.S. patent application Ser. No. 10/697,039, "GAMING MACHINE" which was filed as U.S. patent application Ser. No. 10/697,157, "GAMING MACHINE" which was filed as U.S. patent application Ser. No. 10/697,040, "GAMING MACHINE WITH IMAGE DISPLAY ASSISTANCE FEATURE" which was filed as U.S. patent application Ser. No. 10/697,041, "GAMING MACHINE" which was filed as U.S. patent application Ser. No. 10/697,026, "GAMING MACHINE" which was filed as U.S. patent application Ser. No. 10/697,054, "GAMING MACHINE" which was filed as U.S. patent application Ser. No. 10/697,082, "GAMING MACHINE" which was filed as U.S. patent application Ser. No. 10/697,088, "GAMING MACHINE" which was filed as U.S. patent application Ser. No. 10/697,080, "GAMING MACHINE" which was filed as U.S. patent application Ser. No. 10/697,081, "GAMING MACHINE" which was filed as U.S. patent application Ser. No. 10/697,027, "GAMING MACHINE" which was filed as U.S. patent application Ser. No. 10/697,086, "GAMING MACHINE" which was filed as U.S. patent application Ser. No. 10/697,237, "GAMING MACHINE" which was filed as U.S. patent application Ser. No. 10,697,238, "GAMING MACHINE" which was filed as U.S. patent application Ser. No. 10/697,947, "GAMING MACHINE" which was filed as U.S. patent application Ser. No. 10/697,245, "GAMING MACHINE" which was filed as U.S. patent application Ser. No. 10/697,246, "GAMING MACHINE" which was filed as U.S. patent application Ser. No. 10/697,248, "GAMING MACHINE" which was filed as U.S. patent application Ser. No. 10/697,084, "GAMING MACHINE" which was filed as U.S. patent application Ser. No. 10/697,432, "MOTOR STOP CONTROL DEVICE" which was filed as U.S. patent application Ser. No. 10/697,085, "GAMING MACHINE" which was filed as U.S. patent application Ser. No. 10/697,256, "GAMING MACHINE" which was filed as U.S. patent application Ser. No. 10/697,281, "GAMING MACHINE" which was filed as U.S. patent application Ser. No. 10/697,261, and "GAMING MACHINE" which was filed as U.S. patent application Ser. No. 10/697,258, respectively, all the applications being filed on Oct. 31, 2003 herewith. The co-pending applications including specifications, drawings, and claims are expressly incorporated herein by reference in their entirety.

What is claimed is:

1. A gaming machine comprising:

a variable display device configured to variably display a plurality of symbol rows each having a symbol placement face formed in a curved surface on which a plurality of symbols are placed;

an image display device being provided in front of and opposed to the variable display device and configured to display the symbols through a flat symbol transmission face and to display video images concerning a game, the image display device including a liquid crystal display for displaying the video images and a light guide plate located behind the liquid crystal display and in front of the variable display device, the light guide plate having at least one opening through which the symbols on the variable display device are displayed, the light guide plate providing backlighting to the liquid crystal display in regions outside of the opening;

a symbol illumination device configured to illuminate the symbols; and an image display assistance device being provided lateral to an area between the variable display device and the image display device to cover an area sandwiched between the symbol placement face and the symbol transmission face, and configured to assist image display of the image display device, wherein the symbol illumination device comprises a rear illumination lamp configured to illuminate the symbols from behind the symbols and to provide backlighting to the liquid crystal display in the region within the opening of the light guide plate, and wherein the image display assistance device reflects light emitted from the rear illumination lamp to assist in providing backlighting to the liquid crystal display in the region within the at least one opening of the light guide plate.

2. The gaming machine as claimed in claim 1, wherein the symbol illumination device comprises a front illumination lamp configured to illuminate the symbols from an angled direction of the front of the symbols, and wherein the image display assistance device reflects light emitted from the front illumination lamp.

3. The gaming machine as claimed in claim 1, wherein the image display assistance device is attached to a housing that houses the variable display device.

4. The gaming machine as claimed in claim 1, wherein the image display assistance device comprises a white plate.

5. The gaming machine as claimed in claim 1, wherein the image display assistance device comprises a mirror plate.

6. The gaming machine according to claim 1, wherein the image display assistance device comprises a planar plate.

7. A gaming machine comprising:

a variable display device configured to variably display a plurality of symbol rows on which a plurality of symbols are placed;

an image display device being provided in front of the variable display device and configured to display video images concerning a game, the image display device including a liquid crystal display for displaying the video images and a light guide plate located behind the liquid crystal display and in front of the variable display device, the light guide plate having at least one opening through which the symbols on the variable display device are displayed, the light guide plate providing backlighting to the liquid crystal display in regions outside of the opening;

a symbol illumination device configured to illuminate the symbols; and an image display assistance device being provided lateral to an area between the variable display device and the image display device and configured to reflect light emitted from the symbol illumination device and to assist image display of the image display device, wherein the symbol illumination device comprises a rear illumination lamp configured to illuminate the symbols from behind the symbols, and wherein the image display assistance device reflects light emitted from the rear illumination lamp and reduces dark regions in the area sandwiched between the symbol placement face and the symbol transmission face so as to enhance the viewing of the liquid crystal display.

8. The gaming machine according to claim 7, wherein the symbol illumination device further comprises a front illumination lamp configured to illuminate the symbols from an angled direction of the front of the symbols, and wherein the image display assistance device further reflects light emitted from the front illumination lamp.

9. The gaming machine according to claim 7, wherein the image display assistance device includes a reflective plate attached to a housing that houses the variable display device and the rear illumination lamp behind the plurality of symbol rows of the variable display device, the reflective plate reflecting light emitted by the rear illumination lamp from behind the symbol rows to in front of the symbol rows.

10. The gaming machine according to claim 7, wherein the image display assistance device comprises a white plate.

11. The gaming machine as according to claim 7, wherein the image display assistance device comprises a substantially flat mirror plate.

12. The gaming machine as according to claim 7, wherein the light guide plate receives light through a periphery thereof, the light guide plate transmitting the light received therein through a forward face thereof towards the liquid crystal display.

13. A gaming machine comprising:

a variable display device configured to variably display a plurality of symbol rows on which a plurality of symbols are placed;

an image display device being provided in front of the variable display device and configured to display video images concerning a game, the image display device including a liquid crystal display displaying the video images and a light guide plate located behind the liquid crystal display, the light guide plate having at least one opening through which the symbols on the variable display device are displayed, the light guide plate providing backlighting to the liquid crystal display in regions outside of the at least one opening;

a side illumination device being provided lateral to an area between the variable display device and the image display device and configured to illuminate the symbols from a side of the symbols; and a case that houses at least a part of the variable display device; and a rear illumination lamp disposed behind the symbols and operative to illuminate the symbols from therebehind, wherein the side illumination device includes a planar plate attached to the case and a lighting device provided on the planar plate, the planar plate reflecting light toward the light guide plate to assist in providing backlight to the liquid crystal display in the region within the at least one opening of the light guide plate.

14. The gaming machine according to claim 13, wherein the planar plate comprises a substantially flat white plate, mirror plate, or both.

15. The gaming machine as according to claim 13, wherein the light guide plate receives light through a periphery thereof, the light guide plate transmitting the light received therein through a forward face thereof towards the liquid crystal display.

16. A gaming machine comprising:

a first display device configured to variably display a plurality of symbols;

a second display device including a display panel that is provided opposed to and spaced from the first display device, and the second display device configured to display the symbols through the display panel and to display video images concerning a game on the display panel, the display panel being a liquid crystal display for displaying the video images, the second display device including a light guide plate located behind the liquid crystal display, the light guide plate having at least one opening through which the symbols on the variable display device are displayed to a player, the light guide plate providing backlighting to the liquid crystal display in regions outside of the opening; and a display assistance device including a light reflector provided lateral to an area between the first display device and the display panel of the second display device, the light reflector configured to assist the displaying of the video images display of the second display device by providing reflected light to the liquid crystal display in the region within the opening of the light guide plate, the reflected light assisting in the backlighting of the liquid crystal display; and a rear illumination lamp disposed behind the symbols and operative to illuminate the symbols from therebehind.

17. The gaming machine according to claim 16, wherein the display assistance device includes an illumination device that illuminates the area between the first display device and the display panel of the second display device.

18. The gaming machine according to claim 16, wherein the light reflector comprises a planar plate.

19. The gaming machine according to claim 16, wherein the light reflector reflects light emitted by the rear illumination lamp from a location behind the symbols to a location in front of the symbols.

20. The gaming machine according to claim 16, wherein the image display assistance device is attached to a housing that houses the first display device.

21. The gaming machine according to claim 20, wherein the first display device includes a plurality of mechanical reels.

22. The gaming machine according to claim 16, wherein the light reflector comprises a white plate.

* * * * *